United States Patent
Matsumura et al.

(10) Patent No.: US 9,921,544 B2
(45) Date of Patent: Mar. 20, 2018

(54) IMAGE FORMING APPARATUS, MOLDED RESIN PRODUCT FOR USE WITH THE IMAGE FORMING APPARATUS, AND CARTRIDGE

(71) Applicant: CANON KABUSHIKI KAISHA, Tokyo (JP)

(72) Inventors: Junichi Matsumura, Numazu (JP); Akira Suzuki, Naka-gun (JP); Ryoji Kusudo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/685,946

(22) Filed: Apr. 14, 2015

(65) Prior Publication Data
US 2015/0293492 A1    Oct. 15, 2015

(30) Foreign Application Priority Data

Apr. 15, 2014  (JP) ................................. 2014-084038
Feb. 5, 2015  (JP) ................................. 2015-021651

(51) Int. Cl.
*G03G 21/18* (2006.01)
*G03G 15/08* (2006.01)
(Continued)

(52) U.S. Cl.
CPC ..... *G03G 21/1842* (2013.01); *B29C 45/0001* (2013.01); *B29C 45/0017* (2013.01); *G03G 21/181* (2013.01); *G03G 21/1867* (2013.01); *B29K 2025/06* (2013.01); *B29K 2059/00* (2013.01); *B29L 2031/767* (2013.01);
(Continued)

(58) Field of Classification Search
CPC .................................................... G03G 15/556
See application file for complete search history.

(56) References Cited

U.S. PATENT DOCUMENTS 5,966,567 A   10/1999  Matsuzaki et al.
6,144,815 A   11/2000  Chadani et al.
(Continued)

FOREIGN PATENT DOCUMENTS

JP   2000-015656 A   1/2000
JP   2001-027841 A   1/2001
(Continued)

OTHER PUBLICATIONS

Official Communication in European Patent Application No. 15163520.8, dated Sep. 2, 2015.
(Continued)

*Primary Examiner* — Clayton E Laballe
*Assistant Examiner* — Noam Reisner
(74) *Attorney, Agent, or Firm* — Fitzpatrick, Cella, Harper & Scinto

(57) ABSTRACT

A molded resin product for use with an image forming apparatus includes: a base portion formed of a resin material; a positioning portion provided on the base portion; and a movable member formed by injection molding so as to be movable relative to the base portion. When the molded resin product is connected to a connection part, the positioning portion positions the molded resin product and the connection part relative to each other, and the movable member is contactable to a contact portion of the connection part.

17 Claims, 24 Drawing Sheets

(51) Int. Cl.
B29C 45/00 (2006.01)
B29K 25/00 (2006.01)
B29L 31/00 (2006.01)
B29K 59/00 (2006.01)

(52) U.S. Cl.
CPC ....... *G03G 15/086* (2013.01); *G03G 15/0896* (2013.01); *G03G 2221/166* (2013.01)

(56) References Cited

U.S. PATENT DOCUMENTS

| | | | |
|---|---|---|---|
| 6,154,623 | A | 11/2000 | Suzuki et al. |
| 6,173,140 | B1 | 1/2001 | Suzuki et al. |
| 6,173,145 | B1 | 1/2001 | Chadani et al. |
| 6,205,305 | B1 | 3/2001 | Suzuki et al. |
| 6,219,504 | B1 | 4/2001 | Matsuzaki et al. |
| 6,282,389 | B1 | 8/2001 | Matsuzaki et al. |
| 6,345,164 | B1 | 2/2002 | Yokomori et al. |
| 6,415,121 | B1 | 7/2002 | Suzuki et al. |
| 6,549,736 | B2 | 4/2003 | Miyabe et al. |
| 6,654,578 | B2 | 11/2003 | Suzuki et al. |
| 6,771,920 | B2 | 8/2004 | Abe et al. |
| 6,795,666 | B2 | 9/2004 | Miyabe et al. |
| 6,868,243 | B2 | 3/2005 | Watanabe et al. |
| 6,931,226 | B2 | 8/2005 | Chadani et al. |
| 6,934,485 | B2 | 8/2005 | Miyabe et al. |
| 6,952,543 | B2 | 10/2005 | Kusudo |
| 7,099,607 | B2 | 8/2006 | Suzuki et al. |
| 7,366,439 | B2 | 4/2008 | Anan et al. |
| 7,933,534 | B2 | 4/2011 | Hoshi et al. |
| 8,283,784 | B2 | 8/2012 | Kusudo et al. |
| 8,311,449 | B2 | 11/2012 | Kusudo et al. |
| 8,682,211 | B2 | 3/2014 | Hoshi et al. |
| 8,867,955 | B2 | 10/2014 | Yamaguchi et al. |
| 8,879,944 | B2 | 11/2014 | Takarada et al. |
| 8,918,011 | B2 | 12/2014 | Yamasaki et al. |
| 9,046,823 | B2 | 6/2015 | Satomura et al. |
| 9,052,675 | B2 | 6/2015 | Takarada et al. |
| 9,063,464 | B2 | 6/2015 | Furutani et al. |
| 2002/0012542 | A1* | 1/2002 | Karakama .......... G03G 21/1867 399/27 |
| 2003/0156855 | A1 | 8/2003 | Nittani et al. |
| 2006/0120754 | A1 | 6/2006 | Suzuki et al. |
| 2006/0233568 | A1* | 10/2006 | Itabashi ............ G03G 15/0258 399/111 |
| 2007/0092291 | A1 | 4/2007 | Suzuki et al. |
| 2013/0022368 | A1* | 1/2013 | Takarada .......... G03G 21/1867 399/110 |
| 2013/0114972 | A1 | 5/2013 | Takarada et al. |
| 2013/0121720 | A1* | 5/2013 | Hoshi ................ G03G 15/0898 399/106 |
| 2013/0164039 | A1 | 6/2013 | Matsushita et al. |
| 2014/0029974 | A1 | 1/2014 | Uesugi et al. |
| 2014/0064793 | A1 | 3/2014 | Matsuzaki et al. |
| 2014/0072331 | A1 | 3/2014 | Matsushita et al. |
| 2014/0072345 | A1 | 3/2014 | Matsunaga et al. |
| 2014/0072347 | A1 | 3/2014 | Furutani et al. |
| 2014/0079432 | A1 | 3/2014 | Matsuzaki et al. |
| 2014/0126928 | A1 | 5/2014 | Batori et al. |
| 2014/0140723 | A1 | 5/2014 | Hoshi et al. |
| 2014/0199092 | A1 | 7/2014 | Matsushita et al. |
| 2014/0363196 | A1 | 12/2014 | Wada et al. |
| 2015/0003865 | A1 | 1/2015 | Batori et al. |
| 2015/0037065 | A1 | 2/2015 | Takarada et al. |
| 2015/0071679 | A1 | 3/2015 | Yamasaki et al. |
| 2015/0205226 | A1 | 7/2015 | Komatsu et al. |

FOREIGN PATENT DOCUMENTS

| | | |
|---|---|---|
| JP | 2006-106636 A | 4/2006 |
| JP | 2008-292557 A | 12/2008 |

OTHER PUBLICATIONS

Notice of Allowance in Korean Patent Application No. 10-2015-0052420, dated Mar. 27, 2017.

* cited by examiner (a)

(b)

(a)

(b)

(c)

(a)

(b)

(a)

(b)

(a)

(b)

(c)

IMAGE FORMING APPARATUS, MOLDED RESIN PRODUCT FOR USE WITH THE IMAGE FORMING APPARATUS, AND CARTRIDGE

FIELD OF THE INVENTION AND RELATED ART

The present invention relates to an image forming apparatus, a molded resin product for use with the image forming apparatus, and a cartridge.

In the case where a plastic product having a complicated structure was manufactured in a conventional constitution, many species of parts were separately prepared and were assembled and manufactured in separation steps. Therefore, in order to not only simplify part molding steps but also facilitate assembly, an integrally molding method and an integrally molded product have been proposed (Japanese Laid-Open Patent Application (JP-A) 2000-015656). In this method, a sheet of a rotatable member and a bearing are connected and integrally molded with each other so as to be inseparable from each other, and thereafter the sheet is moved to be predetermined position and is fixed. In general, in an injection molding of plastics, a gap (spacing) corresponding to a thickness of a metal mold is inevitably formed, and therefore when a cavity of the metal mold is used as a bearing as it is and the rotatable member is rotated, a degree of rotation wobbling is large and thus the molded product cannot be put into practical use. Therefore, an example in which a stable rotation function with less wobbling is ensured by moving the sheet positioned in the cavity during the molding to a bearing portion along a slit, and the number of steps of manufacturing and assembling many species of parts is reduced has been proposed.

SUMMARY OF THE INVENTION

According to an aspect of the present invention, there is provided a molded resin product for use with an image forming apparatus, comprising: a base portion formed of a resin material; a positioning portion provided on the base portion; and a movable member formed by injection molding so as to be movable relative to the base portion, wherein when the molded resin product is connected to a connection part, the positioning portion positions the molded resin product and the connection part relative to each other, and the movable member is contactable to a contact portion of the connection part.

According to another aspect of the present invention, there is provided a cartridge detachably mountable to an image forming apparatus, comprising: a molded resin product including a base portion formed of a resin material, a positioning portion provided on the base portion, and a movable member formed by injection molding so as to be movable relative to the base portion; and a connection part connectable to the molded resin product, wherein when the molded resin product is connected to the connection part, the positioning portion positions the molded resin product and the connection part relative to each other, and the movable member is contactable to a contact portion of the connection part.

These and other objects, features and advantages of the present invention will become more apparent upon a consideration of the following description of the preferred embodiments of the present invention taken in conjunction with the accompanying drawings.

DESCRIPTION OF THE EMBODIMENTS

Hereinbelow, embodiments of the present invention will be specifically described with reference to the drawings. However, dimensions, materials and shapes of constituent elements and their relative arrangements and the like described in the following embodiments should be changed appropriately depending on structures and various conditions of apparatuses (devices) to which the present invention is applied, and therefore, the scope of the present invention is not intended to be limited to the following embodiments.

The present invention relates to an electrophotographic image forming apparatus, a process cartridge and a molded resin product for use with the image forming apparatus. The image forming apparatus forms an image on a recording material by using an image forming process such as an electrophotographic process or an ink jet recording process. Examples of the image forming apparatus may include an electrophotographic copying machine, an electrophotographic printer (such as a laser beam printer or an LED printer), a facsimile machine, and a word processor. Further, also an image forming apparatus of an ink jet recording type in which recording is effected by ejecting ink through ejection outlets of a recording head on the basis of image information is included in the scope of the present invention.

[Embodiment 1]

(Image Forming Apparatus Using Bearing)

As Embodiment 1, the case where a molded resin product, according to the present invention, formed by multicolor molding is used for a cartridge detachably mountable to the image forming apparatus will be described with reference to FIGS. 1-6. In this embodiment, a two-color-molded bearing including an electrode portion will be described as an example.

In this embodiment, as the image forming apparatus, the electrophotographic image forming apparatus will be described as an example. A cartridge is a generic name for a drum cartridge for supporting an electrophotographic photosensitive drum, a developing cartridge for supporting a developing means and a process cartridge prepared by integrally assembling the electrophotographic photosensitive drum and a process means into a cartridge (unit). The process means acts on the electrophotographic photosensitive drum, and examples thereof may include not only a charging means, the developing means, the cleaning means and the like, which act on the electrophotographic photosensitive drum, but also an application roller for applying a toner onto a toner carrying member, a remaining toner amount detecting means and the like. The electrophotographic photosensitive drum and the process means correspond to parts (components) for effecting image formation.

Figure 1:
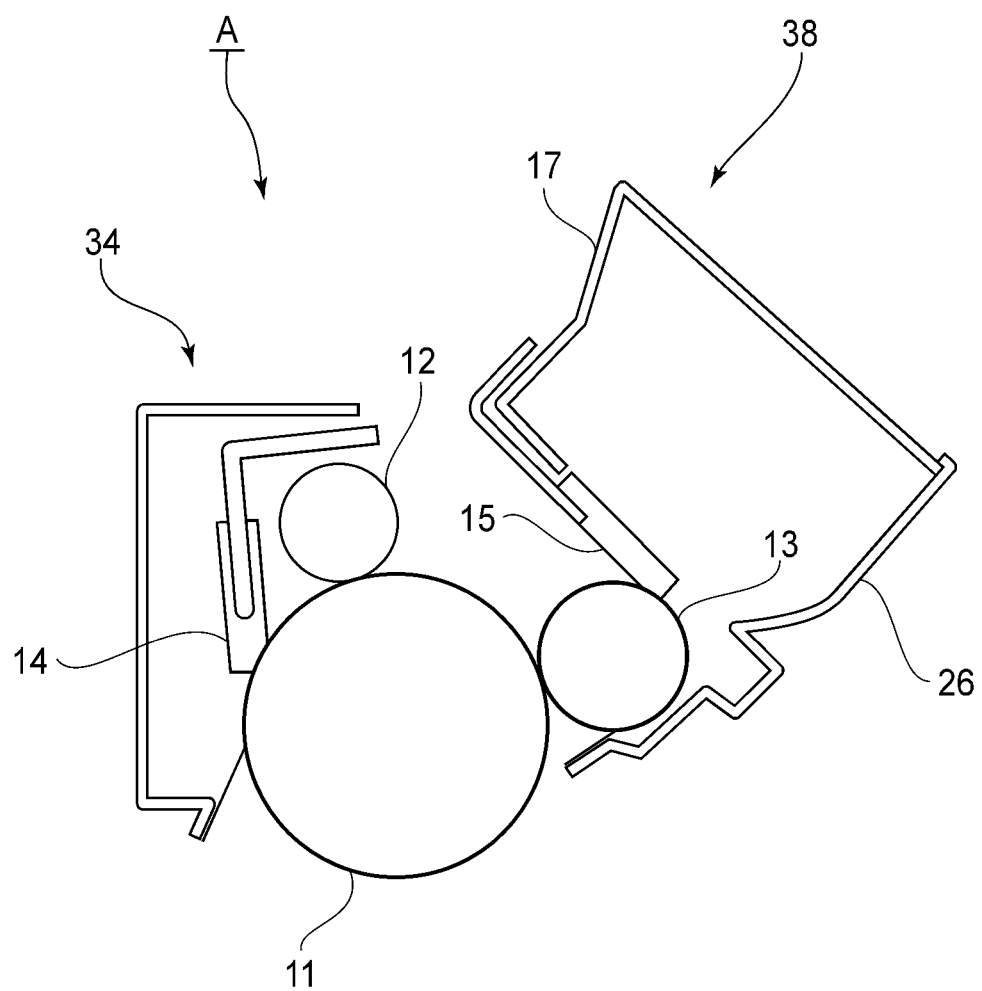
FIG. 1 is a sectional view of a cartridge according to Embodiment 1 of the present invention.
Figure 2:
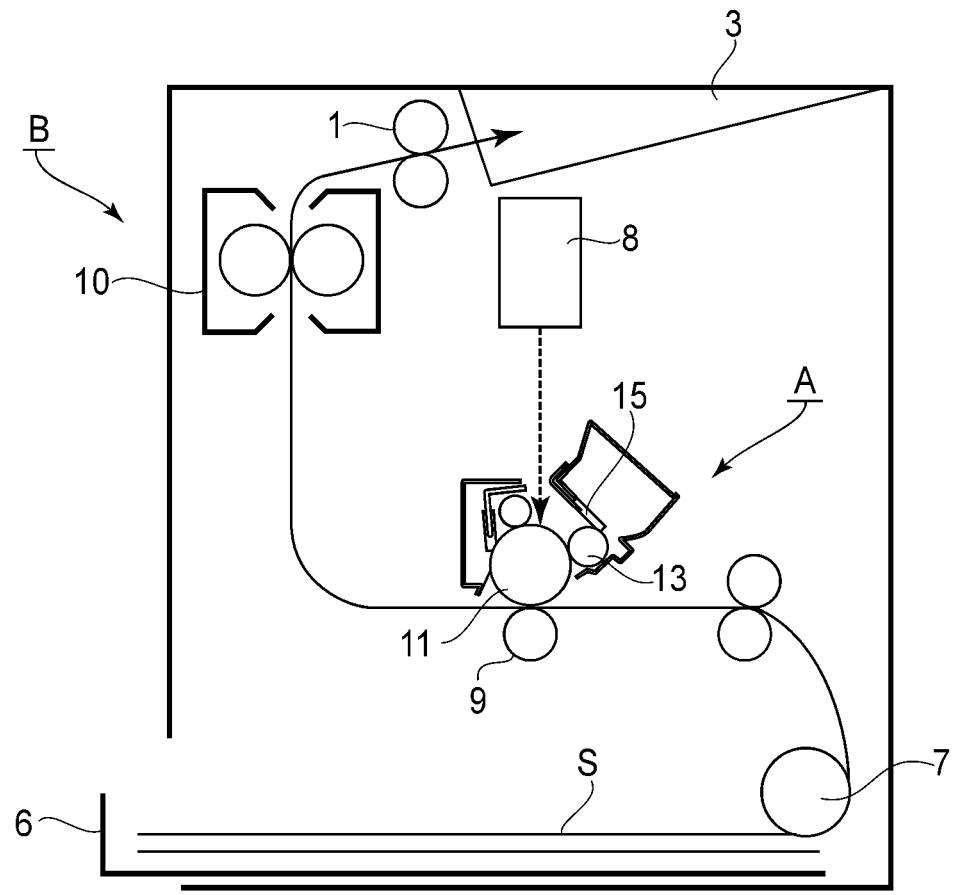
FIG. 2 is a sectional view of an image forming apparatus in Embodiment 1.

First, with reference to FIGS. 1 and 2, structures of a cartridge A including a developing unit according to the present invention and an image forming apparatus main assembly B to which the cartridge A is detachably mountable will be described. FIG. 1 is a sectional view of the cartridge A including the developing unit, and FIG. 2 is a sectional view of the image forming apparatus main assembly B to which the cartridge A including the developing unit is detachably mountable.

(Structure of Cartridge)

The cartridge includes an image bearing member and the process means actable on the image bearing member. As the process means, it is possible to use, e.g., the charging means for electrically charging a surface of the image bearing member, the developing means for forming an image on the image bearing member, and the cleaning means for removing the toner (containing a toner components, a carrier or the like) remaining on the image bearing member surface.

The cartridge A in this embodiment includes, as shown in FIG. 1, the image bearing member (photosensitive drum 11) and its peripheral members including a charging roller 12 as the charging means and a cleaner unit 34 including an elastic cleaning blade 14 as the cleaning means. Further, the cartridge A includes a developing unit 38 including a developing roller 13, a developing blade 15 and a toner accommodating container 26 for accommodating the toner. The cartridge A is prepared by integrally assembling the cleaner unit 34 and the developing unit 38 into a cartridge (unit), and is constituted so as to be detachably mountable to the image forming apparatus main assembly B as shown in FIG. 2.

(Structure of Image Forming Apparatus)

The cartridge A is mounted in the image forming apparatus main assembly B as shown in FIG. 2, and is used for image formation. The image formation is effected by a process described below. First, a sheet S as a recording material (medium) such as paper is fed by a feeding roller 7 from a sheet cassette 6 mounted at a lower portion of the apparatus. In synchronism with the sheet feeding, a latent image is formed on the photosensitive drum 11 by subjecting the photosensitive drum 11 to selective exposure to light. A toner supplied to the developing roller 13 (toner carrying member) is carried in a thin layer on a surface of the developing roller 13. Then, by applying a developing bias (voltage) to the developing roller 13, the toner is supplied depending on the latent image on the photosensitive drum 11, so that the latent image is developed into a toner image. This toner image is transferred onto the fed sheet S by application of a bias voltage to a transfer roller 9. The sheet S is fed to a fixing device 10, and thereafter the image is fixed on the sheet S and then the sheet S is discharged onto a sheet discharge portion 3 provided at an upper portion of the apparatus.

Figure 3:
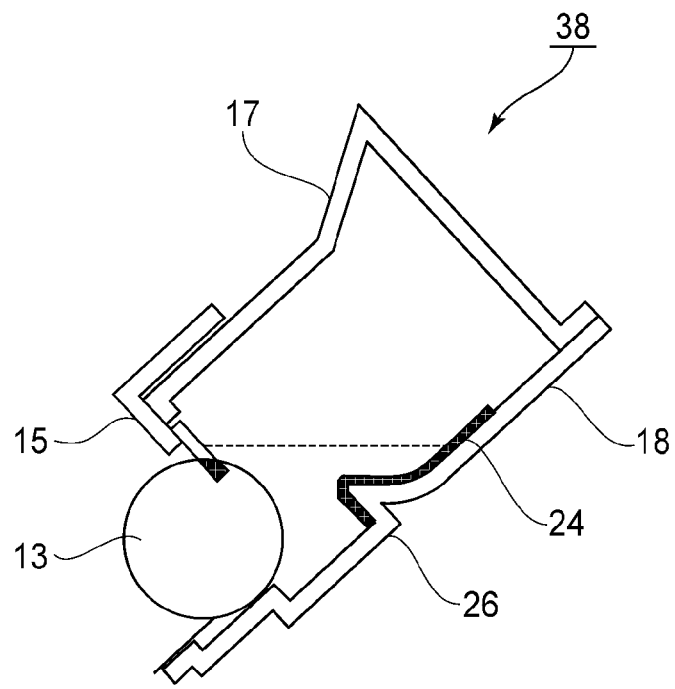
FIG. 3 is a sectional view of a developing unit in Embodiment 1.

Next, a structure of the developing unit 38 will be described with reference to FIGS. 3 and 4. FIG. 3 is a sectional view of the developing unit, and FIG. 4 is a perspective view of the developing unit.

(Developing Unit)

Figure 4:
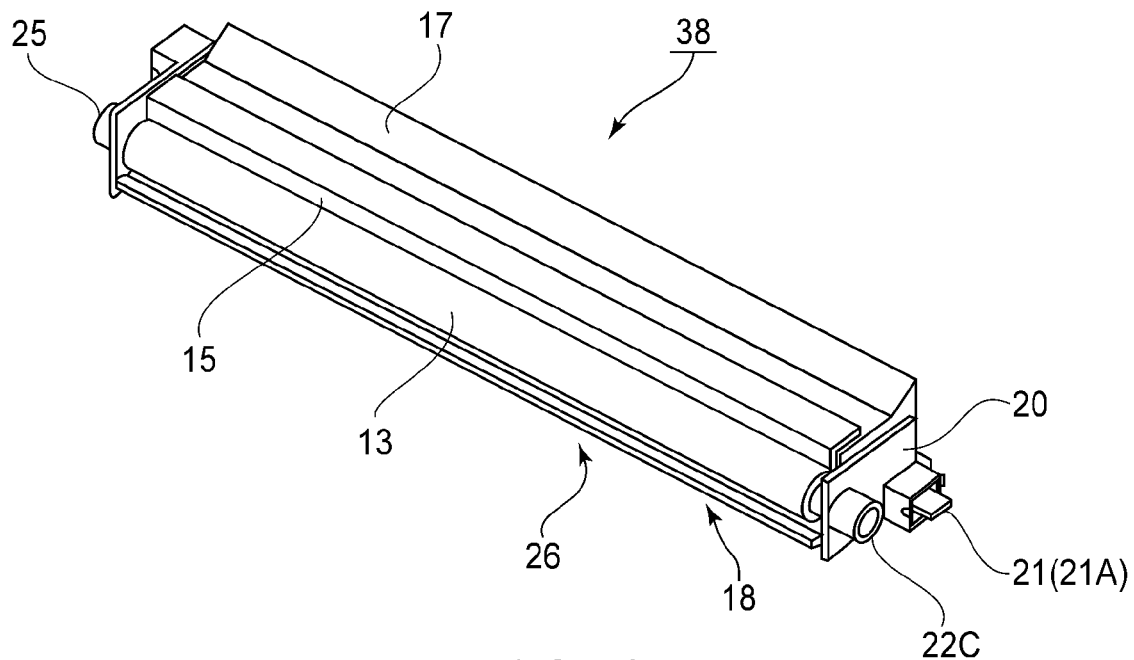
FIG. 4 is a perspective view of the developing unit in Embodiment 1.

The developing unit 38 is constituted, as shown in FIGS. 3 and 4, by the developing roller 13, the developing blade 15, a first frame 17, a second frame 18 and bearings 20 and 25. In the developing unit 38, the bearings 20 and 25 rotatably support the developing roller 13. Further, the first frame 17 and the second frame 18 are combined, and the bearings 20 and 25 are disposed at longitudinal ends, so that the toner accommodating container 26 for accommodating the toner is formed.

In the second frame 18, a remaining amount detecting member 24 is mounted. The remaining amount detecting member 24 is formed with an electroconductive resin sheet, and the electroconductive resin sheet is fixed on the second frame 18 by bonding using a double-side tape, (thermal) welding or the like. In this embodiment, as the electroconductive resin sheet, a resin sheet in which carbon black is dispersed is used. The remaining amount detecting member 24 may only be required to have electroconductivity, and may also use a metal plate such as a stainless steel plate.

In this embodiment, as shown in FIG. 4, of the bearings provided at the longitudinal ends of the toner accommodating container 26, one is a bearing 20 including an electrode. That is, the bearing 20 is connected to a combined structure, of the first frame 17 and the second frame 18, which is a connection part. The bearing 20 includes a bearing portion 22C and a movable member 21 including an electrode portion 21A. Incidentally, another bearing 25 is provided with a bearing member similar to the bearing portion 22C.

(Remaining Toner Amount Detecting Means)

Figure 5:
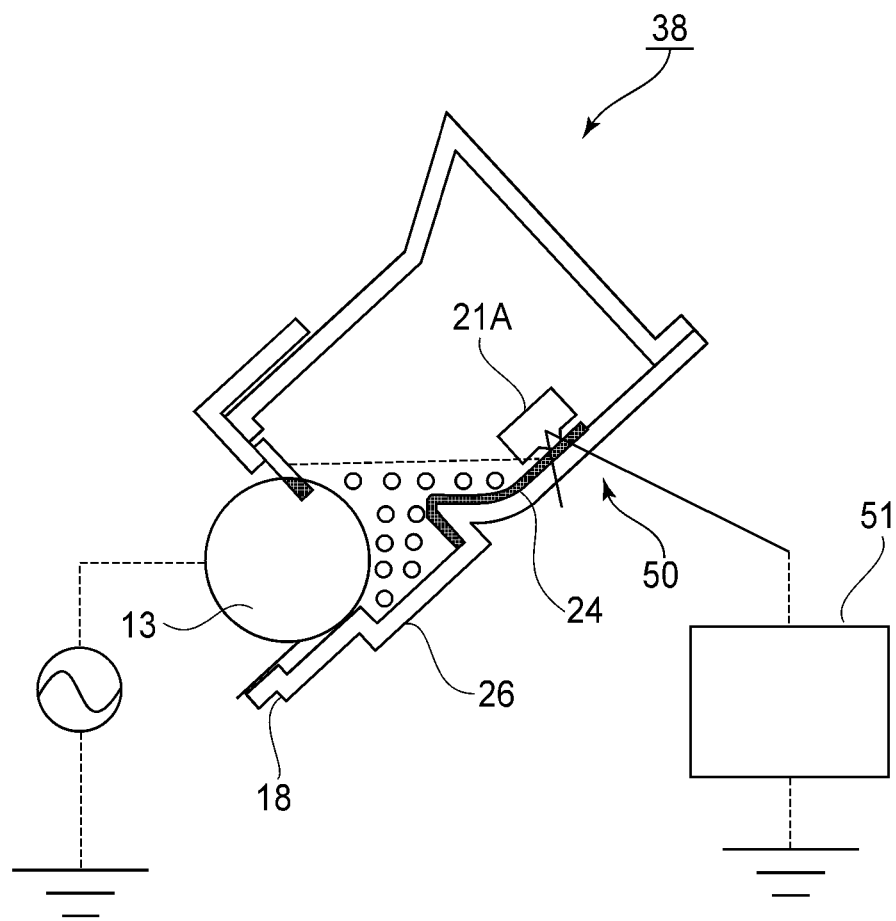
FIG. 5 is a sectional view of the developing unit in Embodiment 1.

An outline of the remaining toner amount detecting means will be described with reference to FIG. 5. FIG. 5 is a sectional view of the cartridge for illustrating the remaining toner amount detecting means.

In the following, as a means for detecting a remaining toner amount, a method in which detection of the remaining toner amount is made by measuring electrostatic capacity will be described. As a detecting means for the electrostatic capacity, the developing unit 38 is provided with the remaining amount detecting member 24. The remaining amount detecting member 24 is electrically connected via the electrode portion 21A to an inputting portion 50 of a remaining toner amount detecting device 51 in the apparatus main assembly B.

When an AC voltage is applied to the developing roller 13, a current corresponding to the electrostatic capacity between the developing roller 13 and the remaining amount detecting member 24 is induced. This electrostatic capacity changes depending on an amount of the toner occupying a space between the developing roller 13 and the remaining amount detecting member 24. That is, a current value depending on the toner amount is outputted from the remaining amount detecting member 24 into the inputting portion 50 of the remaining toner amount detecting device 51 via the electrode portion 21A of the cartridge A. Then, on the basis of the current value inputted into the remaining toner amount detecting device 51, the toner amount between the developing roller 13 and the remaining amount detecting member 24 can be calculated in real time.

As shown in FIG. 5, the remaining amount detecting member 24 is provided on a bottom (surface) of the second frame 18, so that it is possible to know a change in toner amount between the developing roller 13 and the remaining amount detecting member 24. In this embodiment, a constitution in which a change in electrostatic capacity from the time when the toner was consumed to some extent until the toner was used up was measured and then the remaining toner amount was notified to a user was employed. However, the present invention is not limited thereto, but the remaining amount detecting member 24 may also be disposed at any position since a detectable toner amount varies depending on the position of the remaining amount detecting member.

On the basis of a detection result of the toner amount obtained by the remaining toner amount detecting means, it is possible to prompt the user to prepare a new process cartridge via, e.g., a display means.

(Structure of Contact of Remaining Amount Detecting Member)

Figure 6:
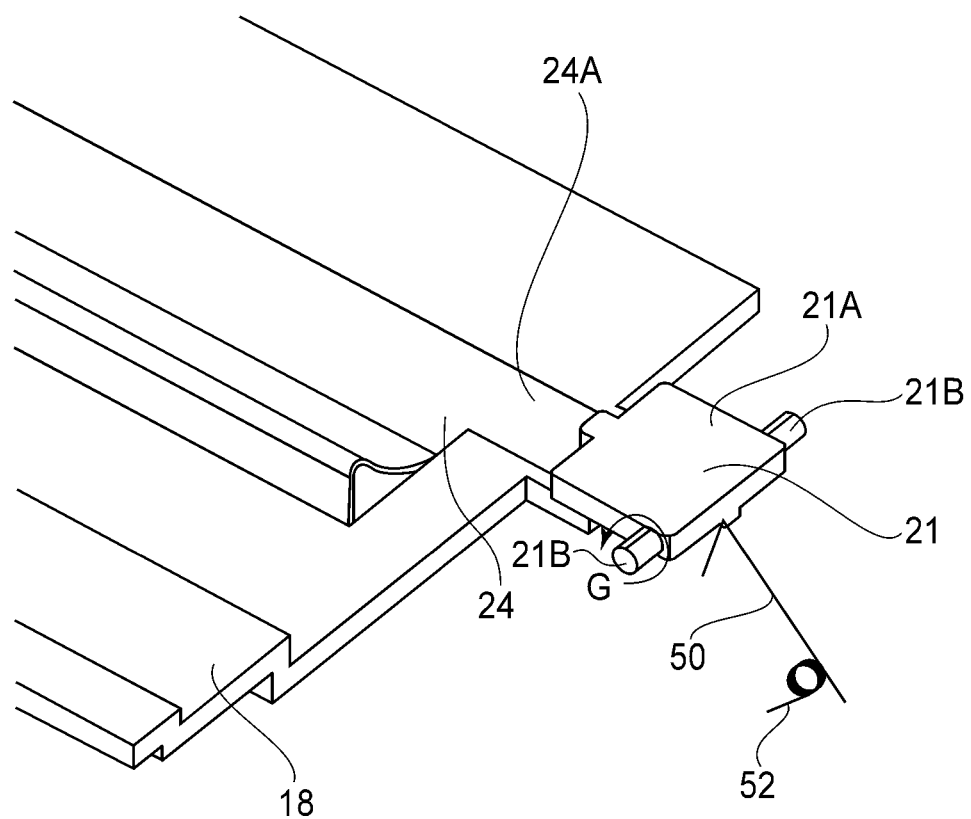
FIG. 6 is an enlarged perspective view showing a part of the developing unit in Embodiment 1.

The bearing including the electrode will be described with reference to FIG. 6. FIG. 6 is a perspective view showing the bearing and an electrical contact of the remaining amount detecting member.

As shown in FIG. 6, the remaining amount detecting member 24 is mounted on the second frame 18 so that an electrical contact portion 24A of the remaining amount detecting member 24 projects in one of longitudinal sides of the toner accommodating container 26. Specifically, the electrical contact portion 24A is provided so as to project into the bearing 20 connected to one of the first frame 17 (not shown) and the second frame 18. In this way, by providing the electrical contact portion 24A of the remaining amount detecting member 24 at an outside of a portion where the toner is accommodated, the electrical contact portion 24A contacts the electrode portion 21A as a contact portion, and thus is electrically connected stably to the electrode portion 21A.

The electrode portion 21A is provided on the movable member 21 of the bearing 20, and when the process cartridge is mounted in the apparatus main assembly B, a force is applied from the inputting portion 50 to the movable member 21, so that the movable member 21 is rotated in an arrow G direction and thus the electrode portion 21A is contactable to the electrical contact portion 24A of the remaining amount detecting member 24 with predetermined contact pressure. In this embodiment, a spring is used as an urging means 52, and when the cartridge A is mounted in a mounting position of the apparatus main assembly B, the electrical contact portion 24A is pressed by a force of about 120 gf exerted from the inputting portion 50 on the electrode portion 21A. As a result, the electrical contact portion 24A of the remaining amount detecting member 24 is electrically connected to the inputting portion 50 via the electrode portion 21A of the bearing 20. The urging means may also be an elastic member such as a rubber.

(Structure of Bearing)

The bearing 20 will be specifically described with reference to FIG. 7.

Figure 7:
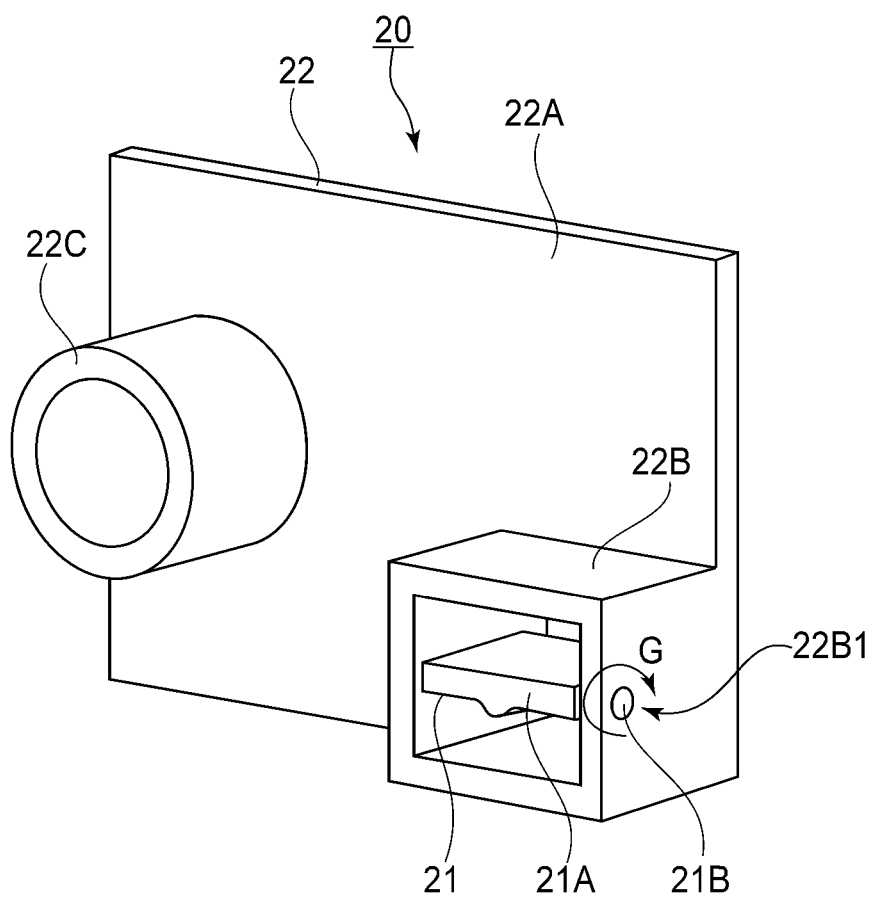
FIG. 7 is a perspective view of a bearing in Embodiment 1.

In this embodiment, as shown in FIG. 7, the bearing 20 is constituted by the movable member 21 and a supporting member 22. The supporting member 22 includes a base portion 22A including an accommodating portion 22B, and a bearing portion 22C. The base portion 22A includes a bearing portion 22B1 at the accommodating portion 22B. On the other hand, the movable member 21 includes the electrode portion 21A and a shaft portion 21B which is connected to the electrode portion 21A and which is rotatable relative to the base portion 22A in the arrow G direction. The shaft portion 21B is supported by the bearing portion 22B1 via a gap (spacing) described later, so that the electrode portion 21A is rotatable relative to the base portion 22A.

In this embodiment, a constitution in which the accommodating portion 22B is provided with the bearing portion 22B1 and thus the electrode portion 21A cannot be disengaged (disconnected) from the bearing 20 is employed. However, other than a constitution in which the accommodating portion 22B is provided so as to surround the electrode portion 21A within a range not preventing motion of the electrode portion 21A as in this embodiment, a constitution in which the accommodating portion 22B is not provided may also be employed. In this case, a constitution in which two sides which extend in a direction crossing an axial direction of the shaft portion 21B and which are provided with at least the bearing portion 22B1 for supporting the shaft portion 21B of the electrode portion 21A are provided on the base portion 22A may only be required to be employed.

In addition, in this embodiment, in order to dispose the electrical contact portion 24A of the remaining amount detecting member 24 at a contactable position with the electrode portion 21A when the movable member 21 is rotated, the accommodating portion 22B is caused to function also as a positioning portion for positioning the supporting member 22 and the second frame 18 relative to each other. Specifically, the electrical contact portion 24A is inserted into and engaged with the accommodating portion 22B, so that the supporting member 22 and the second frame 18 of the toner accommodating container 26 are positioned relative to each other. However, the present invention is not limited to this constitution, but as a separate member from the accommodating portion 22B, a positioning portion for disposing the electrical contact portion 24A of the remaining amount detecting member 24 and the electrode portion 21A in a contactable position when the movable member 21 is moved may also be provided.

When the bearing 20 in this embodiment is formed, in a conventional method of forming the bearing by injection molding, a gap corresponding to a thickness of a metal mold is formed, and therefore in the case where the movable member 21 and the supporting member 22 are integrally molded, the movable member 21 and the supporting member 22 was not able to be disposed with high positional accuracy. On the other hand, in the case where the movable member 21 and the supporting member 22 are formed as separate members, unless each of the movable member 21 and the supporting member 22 are formed with high accuracy and these members are assembled with high positional accuracy, the movable member 21 and the supporting member 22 were not able to be disposed with high positional accuracy. Therefore, in the following, a method of molding the movable member 21 and the supporting member 22 will be described.

(Bearing Molding Method)

Figure 8:
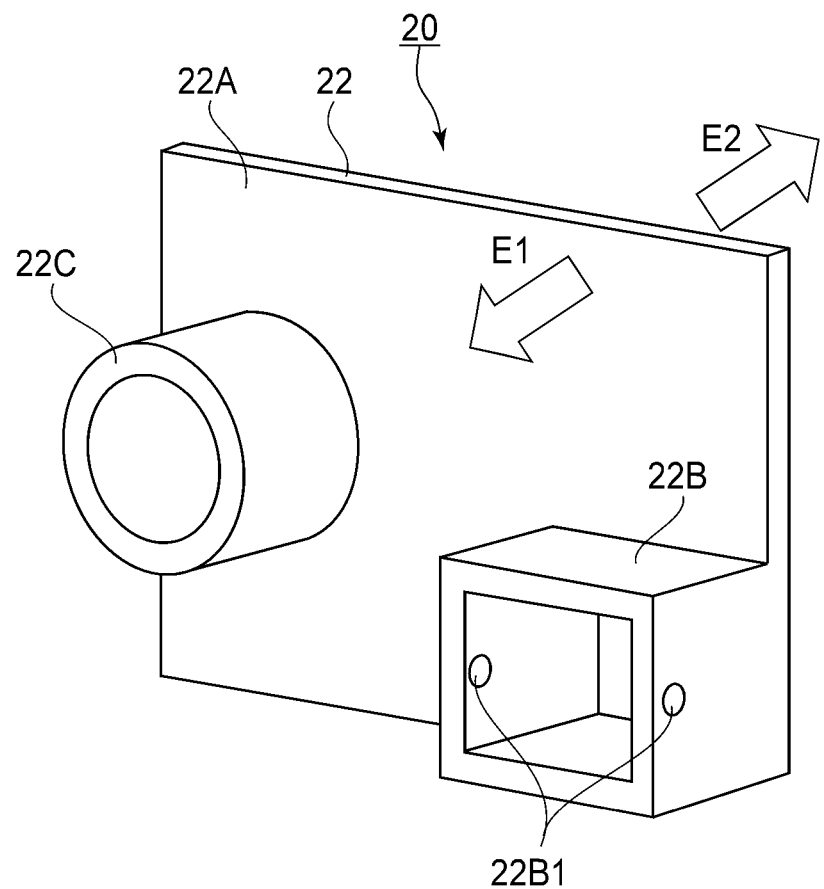
In FIG. 8, (a) and (b) are perspective views each showing parts constituting the bearing in Embodiment 1.
Figure 8:
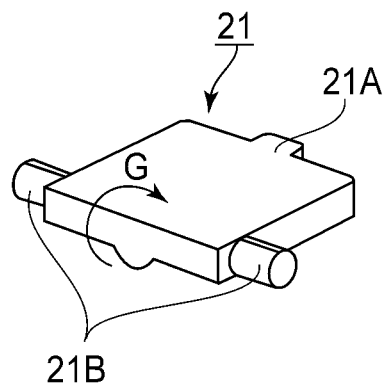
Figure 9:
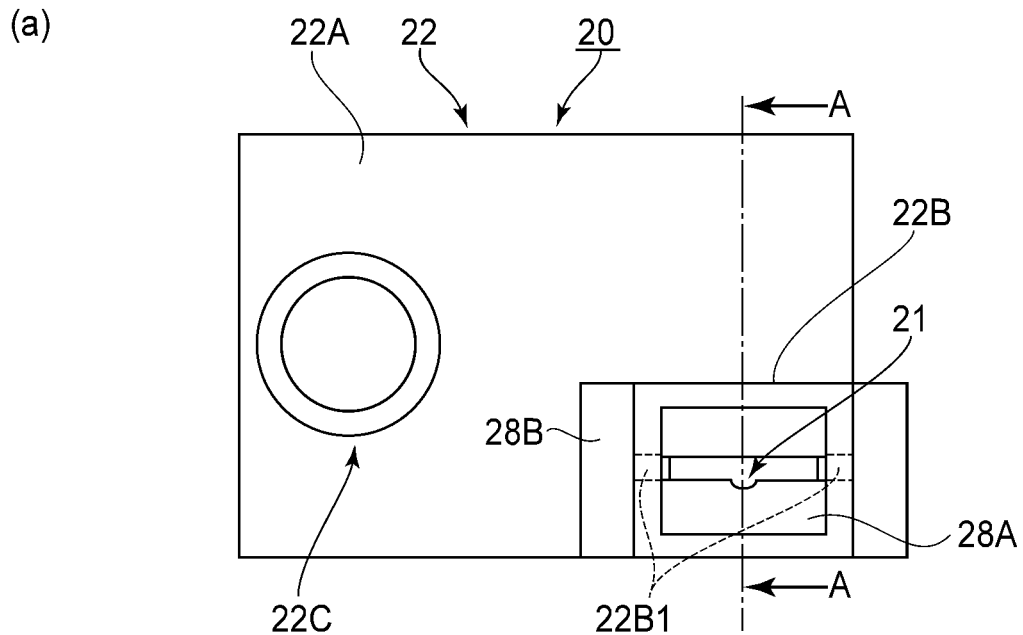
In FIG. 9, (a) and (b) are schematic views for illustrating a bearing forming method in Embodiment 1.
Figure 9:
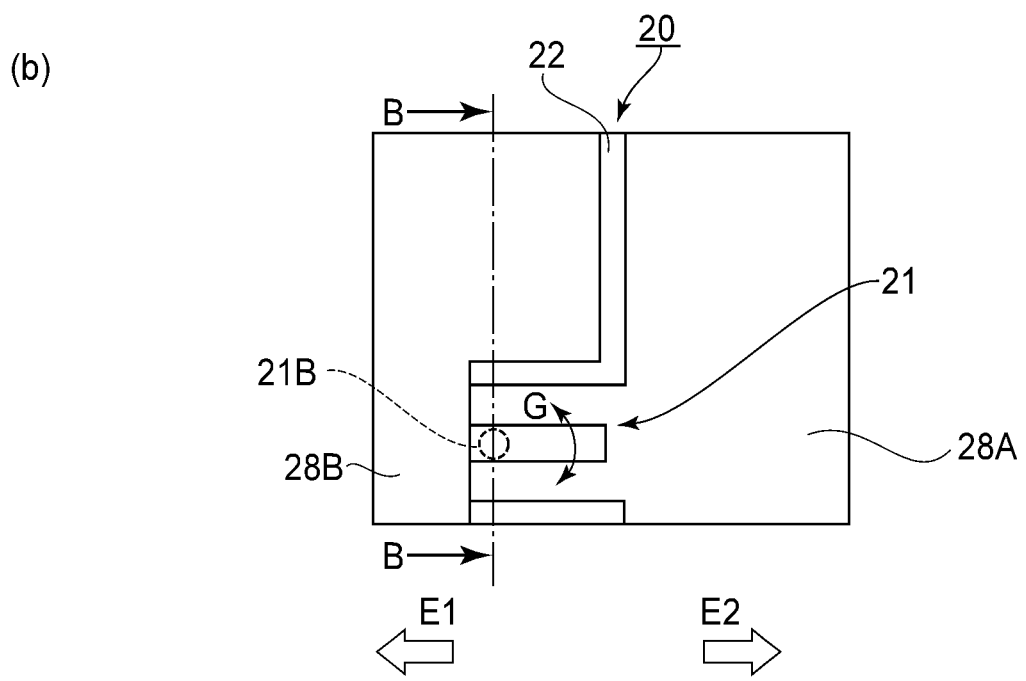
Figure 10:
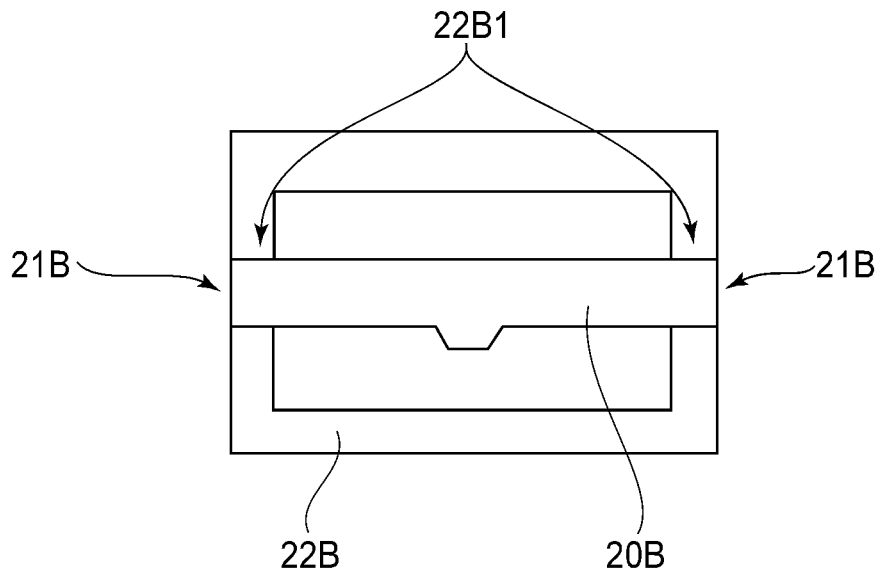
In FIG. 10, (a) and (b) are enlarged views each showing a part of a bearing in Embodiment 2 of the present invention.
Figure 10:
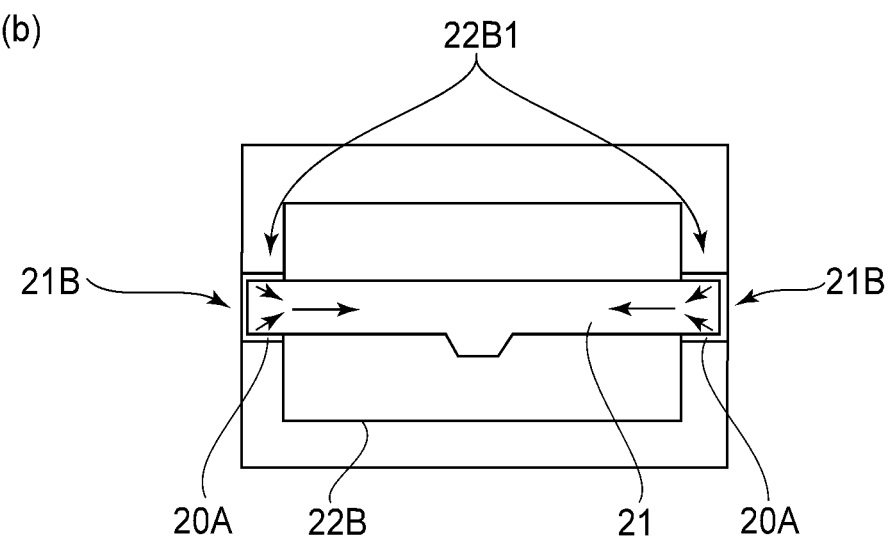

A molding method of the bearing 20 will be described with reference to FIGS. 8-10. In FIG. 8, (a) is a perspective view showing the supporting member 22 of the bearing 20, and (b) is a perspective view showing the movable member 21. In FIG. 9, (a) is a front view of the bearing 20, and (b) is a sectional view, taken along A-A line in (a) of FIG. 9, showing the neighborhood of the movable member 21 of the bearing 20.

Of the bearing 20, the supporting member 22 constituted by the base portion 22A including the accommodating portion 22B and by the bearing portion 22C is formed early. During molding, the mold is opened toward at least one of an arrow E1 direction and an arrow E2 direction. In this embodiment, the arrow E1 direction side is a cavity side (fixed side) and the arrow E2 direction side is a core side (movable side), and a constitution in which the core is moved in the arrow E2 direction to open the mold was employed. However, the arrow E1 direction side is the core side (movable side) and the arrow E2 direction side is the cavity side (fixed side), and a constitution in which the core is moved in the arrow E1 direction to open the mold may also be employed. The bearing portion 22B1 extends in a direction crossing the arrow E1 or E2 direction in which the mold opens, and constitutes an undercut portion where the bearing portion 22B1 cannot be parted in that state. Therefore, the undercut portion is formed by a slide core method in which after the bearing portion 22B1 is formed by a slide core, the slide core is pulled out from an inside of the bearing portion 22B1 by an angular pin with a parting operation, or by a like method.

Thereafter, the movable member 21 including the electrode portion 21A and the shaft portion 21B as shown in (b) of FIG. 8 is integrally molded with the supporting member 22, so that the bearing 20 is formed. At this time, molds 28A and 28B as shown in FIG. 9 are provided as separate members from a mold for the supporting member 22 in order to form a shape of the movable member 21. As a structure of the molds, a structure in which the core-side mold 28A is used as a mold common to the supporting member 22 and the movable member 21 and only the cavity-side mold is different from the core-side mold 28A may also be employed. As shown in FIG. 9, the movable member 21 is molded by injecting an electroconductive resin material into a space formed between the accommodating portion 22B and the molds 28A and 28B. For that reason, the shaft portion 21B of the movable member 21 is formed in such a shape that a shape of the bearing portion 22B1 is transferred. After the molding, a contact interface is formed between the bearing portion 22B1 and the shaft portion 21B. Further, also other than the contact interface between the bearing portion 22B1 and the shaft portion 21B, a contact interface is formed between the accommodating portion 22B and the movable member 21 formed between the accommodating portion 22B and the molds 28A and 28B. In this way, between the movable member 21 and the supporting member 22, the interfaces are formed, so that the electrode portion 21A is rotatable about the shaft portion 21B relative to the base portion 22A of the supporting member 22.

In this embodiment, it is preferable that a resin material used as a first resin material used for the supporting member 22 including the bearing portion 22B1 and a resin material as a second resin material used for the movable member 21 including the electrode portion 21A having the electroconductivity are a combination of the resin materials having no affinity for (compatibility with) each other.

A combination of the resin materials having affinity for each other is a combination of resin materials which melt in each other to form a uniform state with no interface and which are the same material or contain the same material component. The combination of the resin materials having no affinity for each other is a combination of resin materials which are easily separated from each other to form an interface therebetween. For example, as one of the resin materials for the movable member 21 and the supporting member 22, it is possible to use a polystyrene (PS)-based resin material widely used for the frame or parts. In this case, as the other resin material for the movable member 21 or the supporting member 22, it is possible to use resin materials, having no affinity for the PS-based resin material, such as polyoxymethylene (POM), polyamide (PA), polyethylene (PE), polypropylene (PP) and polyethylene terephthalate (PET).

In this embodiment, as the combination of the resin materials for the bearing 20, the PS-based resin material was used as the resin material for the supporting member 22, and POM having electroconductivity was used as the resin material for the movable member 21. The resin material having electroconductivity refers to a resin material having an electrical conductivity of 10 $\Omega$.cm or less as measured by a measuring method according to JIS K 7194, and the resin material having no electroconductivity refers to a resin material having the electrical conductivity of more than 10 $\Omega$.cm. In this way, by employing the combination of the resin materials having no affinity for each other, a molded product formed of the first resin material is used as a mold, and then the second resin material is injected into the mold, so that even after the second resin material is integrally molded with the first resin material, the bearing portion 22B1d and the shaft portion 21B are separable at an interface therebetween. For this reason, it is possible to form the movable member 21 including the electrode portion 21A rotatable about the shaft portion 21B relative to the base portion 22A of the supporting member 22.

(Heat Conduction During Formation of Bearing)

Next, heat contraction during formation of the bearing 20 will be described with reference to FIG. 10. In FIG. 10, (a) is a sectional view of the neighborhood of the movable member 21 taken along B-B cross section in (b) of FIG. 9 during the molding of the bearing 20. Further, (b) of FIG. 10 is a sectional view of the neighborhood of the movable member 21 taken along the B-B cross section in (b) of FIG. 9 after the molding of the bearing 20. In FIG. 10, only a part of the mold for forming the shape of the movable member 21 is illustrated.

A dimensional relationship, by heat contraction, between the bearing portion 22B1 and the shaft portion 21B of the movable member 21 is as follows. As shown in (a) of FIG. 10, the bearing portion 22B1 of the accommodating portion 22B is molded early with the first resin material, and then the first resin material is cooled and solidified by a cooling step in the member. Then, after the bearing portion 22B1 is molded, the electroconductive resin material which is the second resin material is injected into the bearing portion 22B1. This electroconductive resin material is cooled and solidified from a state immediately after the molding as shown in (a) of FIG. 10 by a cooling step in the mold via the third portion 22B1, so that the shaft portion 21B is molded. Further, the shaft portion 21B contracts as shown in (b) of FIG. 10 by being cooled, so that a volume thereof decreases. For this reason, when temperatures of the bearing portion 22B1 and the shaft portion 21B become the substantially same, a gap is formed between the bearing portion 22B1 and the shaft portion 21B. That is, between the bearing portion 22B1 and the shaft portion 21B, a gap portion 20A which is space where the electrode portion 21A is rotatable is formed. Accordingly, the bearing 20 is formed, in view of an operation (use) state after the molding, depending on coefficient of expansion of each of the first and second resin materials so that a diameter of the shaft portion 21B is prevented from becoming larger than a diameter of the bearing portion 22B1 thereby to ensure the gap portion 20A. For this reason, e.g., a temperature of the bearing portion 22B1 during the molding is decreased to a temperature lower than the lowest temperature estimated in an operation environment after the molding, and thereafter the movable member 21 including the shaft portion 21B is formed. As a result, the movable member 21 can be smoothly rotated about the bearing portion 22B1.

(Effect of this Embodiment)

In the conventional constitution, the shaft was required to be moved to the bearing portion along the slit, so that when a product requiring high accuracy was formed, it was difficult to dispose the rotatable member with high accuracy.

In this regard, as described above, by employing the constitution according to the present invention, it becomes possible to not only simplify the manufacturing step and the assembling step of the parts but also dispose the movable member and the assembled connection part with high reliability, so that an assembling property of the cartridge can be improved.

Specifically, in the conventional constitution, in the case where a plurality of parts were assembled and formed, in view of a dimensional error generating when individual parts were manufactured, size-adjusted parts were used. As a result, a yield in the assembling step is improved and the assembling step can be simplified, whereas in the case of including a movable part, between the movable part and another part, a larger gap (spacing) than is necessary was provided. Further, combined with a lowering in positional accuracy of the members generated in the assembling step, it was unable to dispose the movable part and the assembled part with high accuracy. In this regard, in this embodiment according to the present invention, by using the movable member 21 formed by the injection molding so as to be movable relative to the base portion 22A, it is possible to form the bearing 20 without providing the larger gap than is necessary between the supporting member 22 and the movable member 21. Further, by providing the positioning portion, it is possible to dispose the second frame 18 of the toner accommodating container 26 relative to the movable member 21 with high accuracy. By these constitutions, it is possible to realize a constitution in which the movable member 21 contacts the electrical contact portion 24A which is the contact portion with high reliability. In this embodiment, the accommodating portion 22B surrounding the movable member 21 is caused to function also as the positioning portion, so that positional accuracy between the supporting member 22 and the movable member 21 can be enhanced.

In addition, in this embodiment, in order to use the movable member 21 as the electrode, the electroconductive resin material was used. The electroconductive resin material used for the electrode portion 21A is prepared by dispersing, in a base material having no electroconductivity, electroconductive particles such as carbon black particles or metal particles or electroconductive fibers such as carbon fibers, and therefore the electroconductive resin material hardens in general, while being liable to fragile. For that reason, there is a liability that folding or the like occurs during the assembling of the electrode portion 21A. Further, in the case where an electroconductive resin sheet is used as the remaining amount detecting member 24, the electrode portion 21A and the remaining amount detecting member 24 are assembled while contacting each other, and therefore there was a liability that abrasion or peeling of the electroconductive resin sheet generated. However, by employing the constitution according to this embodiment, these liabilities can be eliminated.

[Embodiment 2]

In Embodiment 1, as the molded resin product used in the cartridge detachably mountable to the image forming apparatus, the bearing including the electrode portion rotatable relative to the supporting member was described. In this embodiment, as the molded resin product, a bearing including an electrode portion slidable in a predetermined direction relative to a supporting member will be described with reference to FIG. 11. Similarly as in the general structures of the cartridge and the image forming apparatus in Embodiment 1, the cartridge as shown in FIG. 1 is used also in this embodiment and is constituted so as to be detachably mountable to the apparatus main assembly B as shown in FIG. 2.

(Structures of Bearing and Contact of Remaining Amount Detecting Member)

Figure 11:
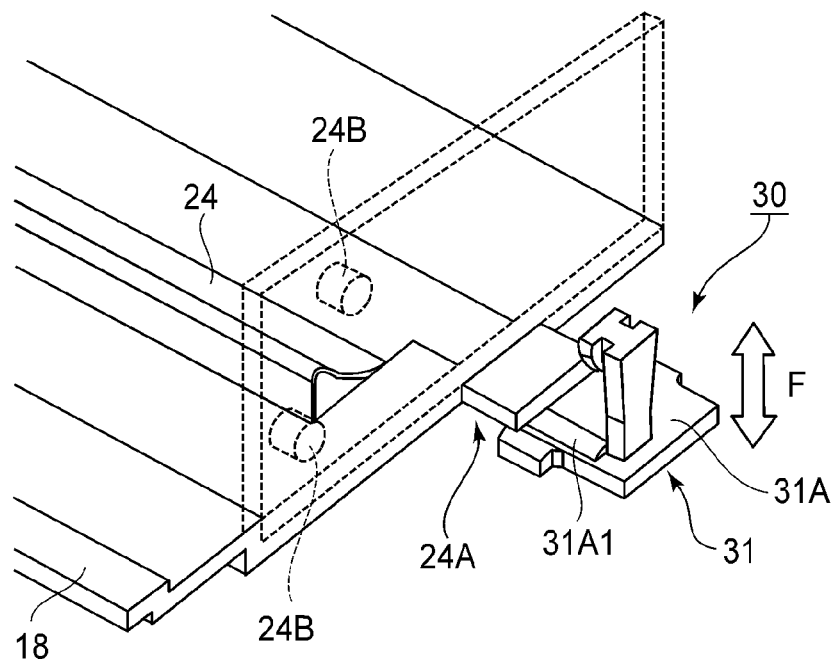
In FIG. 11, (a) to (c) are enlarged views each showing a part of a developing unit in Embodiment 2.
Figure 11:
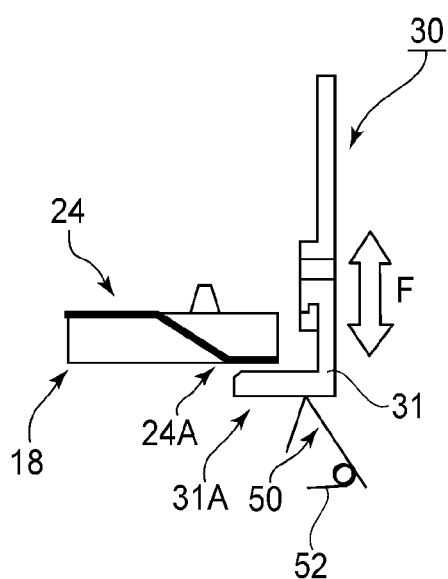
Figure 11:
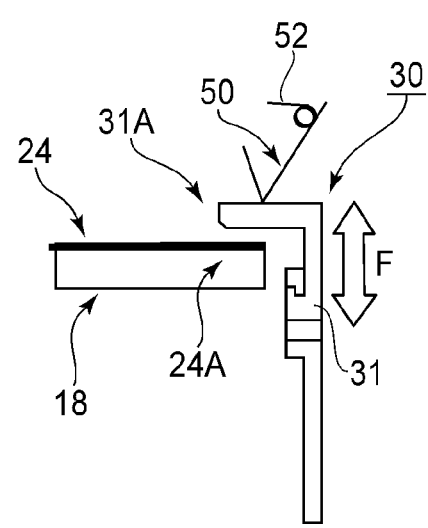

The bearing including the electrode will be described with reference to FIG. 11. In FIG. 11, (a) is a perspective view showing the bearing and an electrical contact of the remaining amount detecting member, and (b) is a sectional view showing the bearing and the electrical contact of the remaining amount detecting member taken along an axial direction of the developing roller.

As shown in (a) of FIG. 11, the remaining amount detecting member 24 is mounted on the second frame 18. Further, an electrical contact portion 24A of the remaining amount detecting member 24 projects in one of longitudinal sides of the toner accommodating container 26. Specifically, the electrical contact portion 24A is provided so as to project into a bearing 30 connected to one of the first frame 17 (not shown) and the second frame 18. In this way, by providing the electrical contact portion 24A of the remaining amount detecting member 24 at an outside of a portion where the toner is accommodated, the electrical contact portion 24A contacts an electrode portion 31A as a contact portion of a movable member 31, and thus is electrically connected stably to the electrode portion 31A.

As shown in (b) of FIG. 11, the remaining amount detecting member 24 is mounted on the second frame 18 so that the electrical contact portion 24A of the remaining amount detecting member 24 projects in one of longitudinal sides of the toner accommodating container 26. The electrode portion 31A of the movable member 31 is provided on the movable member 31 of the bearing 30, and when the process cartridge is mounted in the apparatus main assembly B, a force is applied from the inputting portion 50 to the movable member 31, so that the movable member 31 slides in an arrow F direction and thus the electrode portion 31A is contactable to the electrical contact portion 24A of the remaining amount detecting member 24 with predetermined contact pressure. In this embodiment, a spring is used as an urging means 52, and when the cartridge A is mounted in a mounting position of the apparatus main assembly B, the electrical contact portion 24A is pressed by a force of about 120 gf exerted from the inputting portion 50 on the electrode portion 31A. As a result, the electrical contact portion 24A of the remaining amount detecting member 24 is electrically connected to the inputting portion 50 via the electrode portion 31A of the bearing 30. The urging means may also be an elastic member such as a rubber.

The electrical contact portion 24A of the remaining amount detecting member 24 is, as shown in (a) of FIG. 11, provided on the surface of the second frame 18 outside the toner accommodating container 26 in one of the longitudinal sides of the toner accommodating container 26. In this case, the remaining amount detecting member 24 is formed with the electroconductive resin sheet, so that the electrical contact portion 24A is pulled out from the surface where the toner in the toner accommodating container 26 exists to the surface of the second frame 18 in an opposite side, and thus is exposed. Then, by sliding the electrical contact portion 24A relative to the supporting member 32, the electrode portion 31A is contacted to the exposed electrical contact portion 24A, so that the electrical contact portion 24A is electrically connected to the inputting portion 50.

As shown in (a) of FIG. 11, a constitution in which the electrode portion 31A includes an electrode contact portion 31A1 which is a linear projected portion having an arcuate cross section perpendicular to the longitudinal direction was employed. The electrode contact portion 31A1 extends in a direction crossing the arrow F direction, in the Figure, which is a movement direction (sliding direction) of the movable member 31. On the other hand, the electrical contact portion 24A of the remaining amount detecting member 24 is constituted by a flat surface portion substantially perpendicular to the movement direction. For this reason, the portion of contact between the electrode portion 31A and the electrical contact portion 24A has a rectangular strip shape or a linear shape such that the electrode contact portion 31A1 which is the linear projected portion and the electrical contact portion 24A which is the flat surface portion contact each other. As a result, compared with the case where the flat surface portion of the electrode portion 31A and the flat surface portion of the electrical contact portion 24A are contacted to each other, a contact pressure per unit area can be increased, so that electrical conduction between the electrode portion 31A and the electrical contact portion 24A can be stably ensured. The structures of the electrode portion 31A and the electrical contact portion 24A are not limited thereto, but it is also possible to employ the constitution in which these portions extend to one of the longitudinal sides of the toner accommodating container 26 on the same plane similarly as in the case of FIG. 6 and to employ a constitution in which the electrode portion 31A is contacted to the electrical contact portion 24A as shown in (c) of FIG. 11.

(Structure of Bearing)

Figure 12:
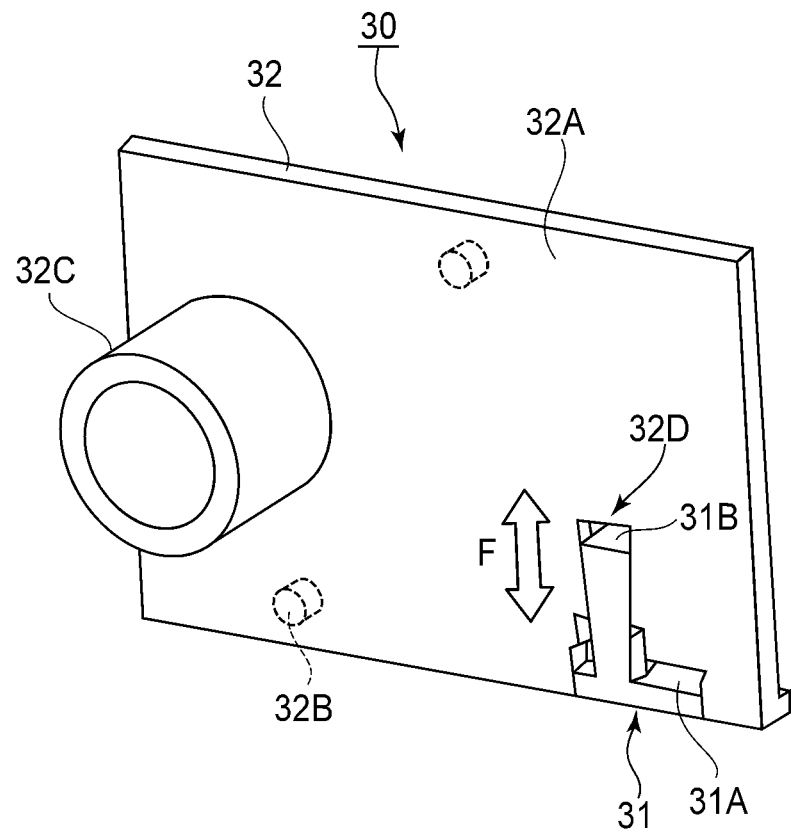
FIG. 12 is a perspective view of the bearing in Embodiment 2.
Figure 13:
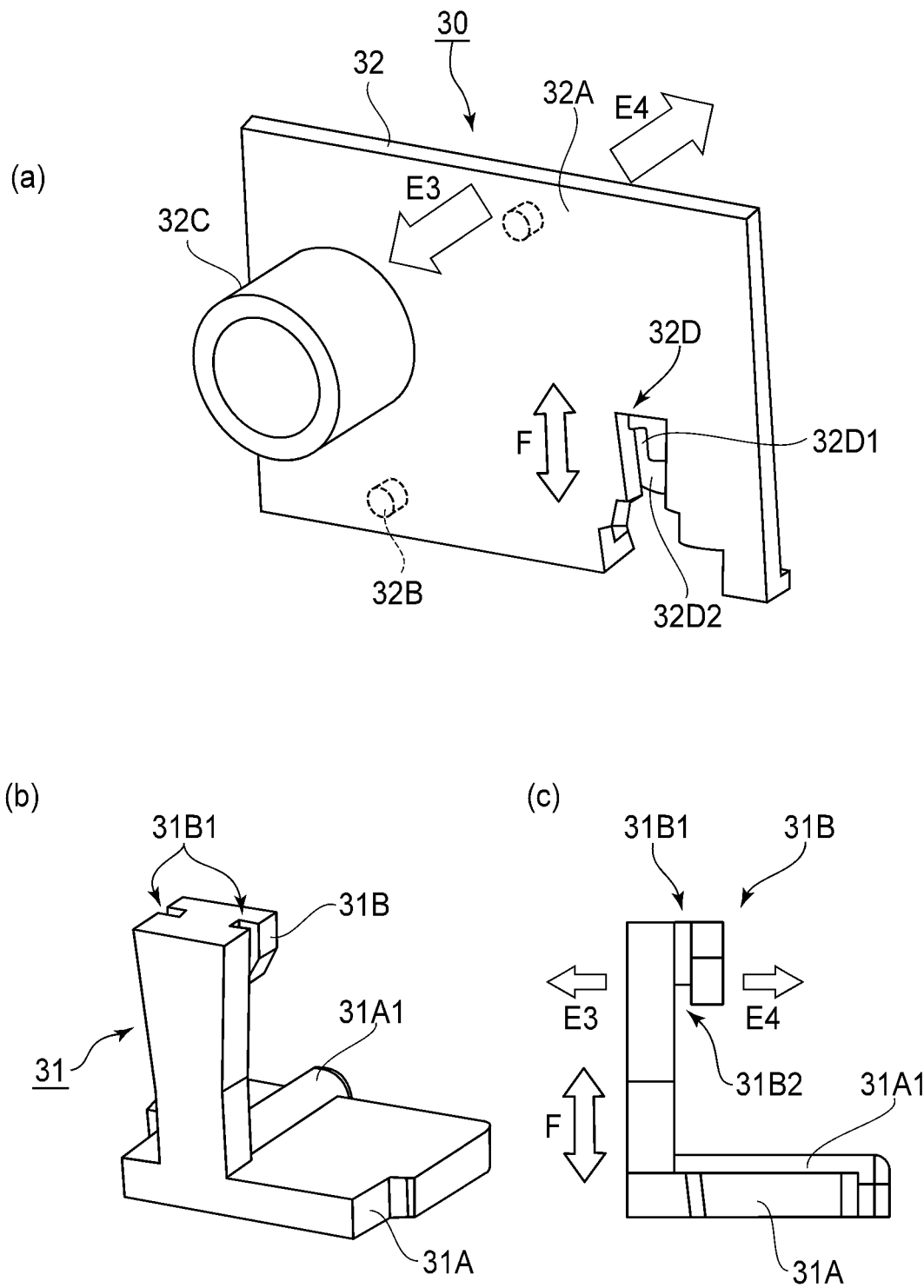
In FIG. 13, (a) and (b) are perspective views each showing parts constituting the bearing in Embodiment 2, and (c) is a sectional view showing the parts constituting the bearing in Embodiment 2.

The bearing 30 including the electrode portion will be described with reference to FIGS. 12 and 13. FIG. 12 is a perspective view of the bearing 30. In FIG. 13, (a) to (c) are illustrations of the bearing 30, wherein (a) is the illustration showing the supporting member 32 constituted by a base portion 32A, a positioning portion 32B and a bearing portion 32C, and (b) and (c) are the illustrations showing the movable member 31.

In this embodiment as shown in FIG. 12, the bearing 30 is constituted by the movable member 31 and the supporting member 32. The supporting member 32 includes the base portion 32A including a portion-to-be-engaged 32D, the positioning portion 32B provided as a part of the base portion 32A, and the bearing portion 32C. The positioning portion 32B is provided behind the base portion 32A as indicated by a broken line in FIG. 12 and is not visible in actuality. On the other hand, the movable member 31 includes the electrode portion 31A and an engaging portion 31B connected to the electrode portion 31A.

The engaging portion 31B engages with the portion-to-be-engaged 32D via a gap portion described later, so that the movable member 31 is slidable in the arrow F direction relative to the base portion 32A. Specifically, as shown in FIG. 13, the portion-to-be-engaged 32D is provided with a limiting (regulating portion) 32D1 having a linear projected shape, and the limiting portion 32D1 is engaged with a supporting portion 31B1, having a groove shape, of the engaging portion 31B. As a result, the movable member 31 is supported slidably in the arrow F direction relative to the base portion 32A. Further, in one side with respect to the arrow F direction, the portion-to-be-engaged 32D is provided with a preventing portion 32D2, and the preventing portion 32D2 is contacted to a retaining portion 31B2 of the engaging portion 31B. The preventing portion 32D2 is disposed so as to contact at least the retaining portion 31B2, so that in the case where the movable member 31 slides toward the one side in the arrow F direction, the movable member 31 is prevented from being detached from the supporting member 22. That is, in this embodiment, a constitution in which the movable member 31 is not detached from the supporting member 32 is employed. A portion where the movable member 31 is surrounded by the base portion 32A has such a shape that a width thereof increases from one end side toward the other end side ((a) of FIG. 14), and the movable member 31 is movable relative to the base portion 32A from one end side toward the other end side.

In this embodiment, the positioning portion 32B is provided as a part of the base portion 32A. By the positioning portion 32B, the electrical contact portion 24A of the remaining amount detecting member 24 positions the electrode portion 31A relative to each other when the movable member 31 is moved, so that the supporting member 32 and the second frame 18 of the toner accommodating container 26 can be disposed at a contactable position. Specifically, in this embodiment, a portion-to-be-positioned 24B is provided on a side wall portion, provided on the second frame 18, indicated by a broken line in (a) of FIG. 11. On the other hand, the positioning portion 32B is, as indicated by a broken line in FIG. 13, provided on the surface of the base portion 32A toward an arrow E4 direction. By engaging the portion-to-be-positioned 24B and the positioning portion 32B, the positioning is made. The present invention is not limited to this constitution, but may also employ a constitution in which when the movable member 31 is moved, the electrical contact portion 24A of the remaining amount detecting member 24 can be disposed at a contactable position with the electrode portion 31A.

(Bearing Molding Method)

Figure 14:
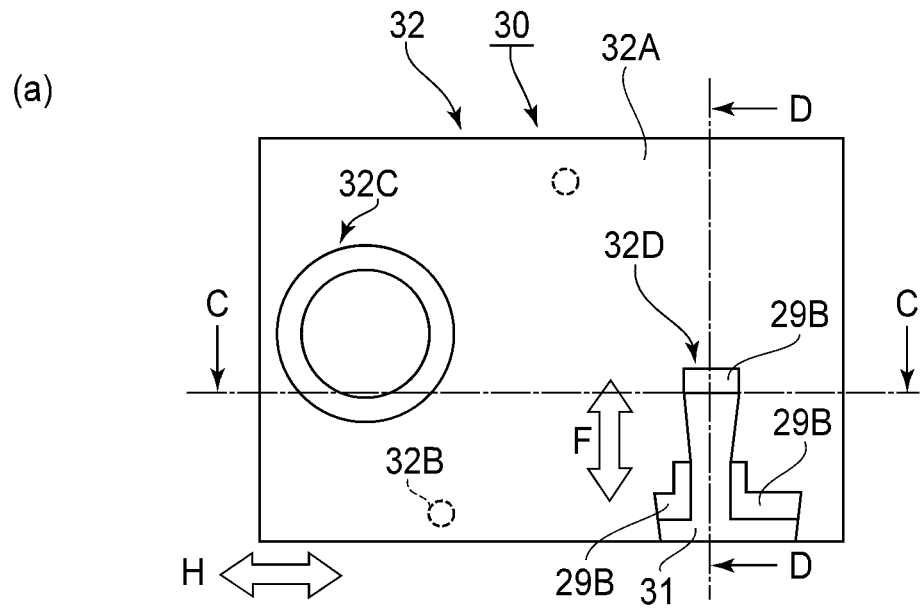
In FIG. 14, (a) and (b) are schematic views for illustrating a bearing forming method in Embodiment 2.
Figure 14:
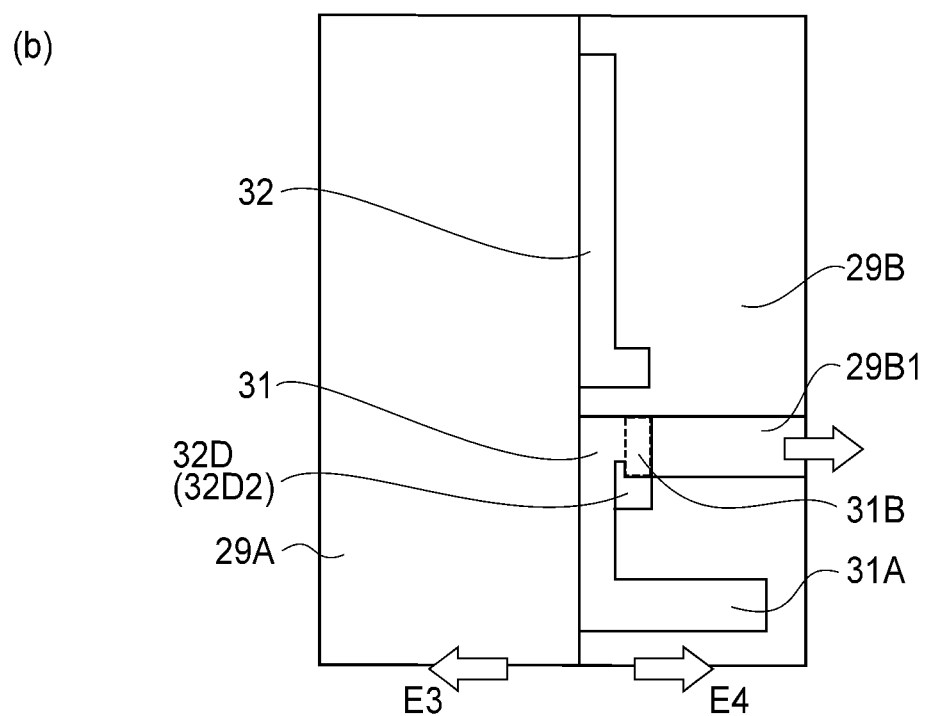

A molding method of the bearing 30 will be described with reference to FIGS. 13 and 14. In FIG. 14, (a) is a front view of the bearing 30, and (b) is a sectional view, taken along C-C line in (a) of FIG. 14, showing the neighborhood of the movable member 31 of the bearing 30.

Of the bearing 30, the supporting member 32 constituted by the base portion 32A, the positioning portion 32B and the bearing portion 32C is formed early. During molding, the mold is opened toward at least one of an arrow E3 direction and the arrow E4 direction. In this embodiment, the arrow E3 direction side is a cavity side (fixed side) and the arrow E4 direction side is a core side (movable side), and a constitution in which the core is moved in the arrow E4 direction to open the mold was employed. However, the arrow E3 direction side is the core side (movable side) and the arrow E4 direction side is the cavity side (fixed side), and a constitution in which the core is moved in the arrow E3 direction to open the mold may also be employed.

Thereafter, the movable member 31 as shown in (b) of FIG. 13 is integrally molded with the supporting member 32, so that the bearing 30 is formed. At this time, molds 29A and 29B as shown in FIG. 14 are provided as separate members from a mold for the supporting member 32 in order to form a shape of the movable member 31. As a structure of the molds, a structure in which the cavity-side mold 29A is used as a mold common to the supporting member 22 and the movable member 31 and only the core-side mold is different from the cavity-side mold 29A may also be employed. Further, as shown in (b) of FIG. 14, after the supporting member 32 is formed, a part 29B1 of the core-side mold 29B in a region superposed on or adjacent to the portion-to-be-engaged 32D is moved in the arrow E4 direction which is a member-opening direction, and may also be used as a mold for forming the movable member 31. In this way, the part 29B1 of the cavity-side mold 29B superposed on the portion-to-be-engaged 32D is moved in the arrow E4 direction, so that a space for forming the portion-to-be-engaged 32D can be provided. Further, the movable member 31 is molded by injecting an electroconductive resin material into a space formed between the supporting member 32 and the molds 29A and 29B. For that reason, the engaging portion 31B of the movable member 31 is formed in such a shape that a shape of the portion-to-be-engaged 32D is transferred.

In this way, a contact interface is formed between the molded portion-to-be-engaged 32D and the engaging portion 31B. Further, also other than the contact interface between the portion-to-be-engaged 32D and the engaging portion 31B, a contact interface is formed between the base portion 32A and the movable member 31 formed between the base portion 21A and the molds 29A and 29B. In this way, between the movable member 31 and the supporting member 32, the interfaces are formed, so that the engaging portion 31B is engaged with the portion-to-be-engaged 32D to guide the movable member 31, thus permitting movement of the movable member 31 in the arrow F direction which is the movement direction.

Also in this embodiment, similarly as in Embodiment 1, it is preferable that a first resin material used as a resin material for the supporting member 32 including the portion-to-be-engaged 32D and a second resin material used as a resin material for the movable member 31 are a combination of the resin materials having no affinity for (compatibility with) each other. As a result, the movable member 31 and the supporting member 32 are separable at the interface, so that the engaging portion 31B is slidable with the portion-to-be-engaged 32D.

(Heat Conduction During Formation of Bearing)

Figure 15:
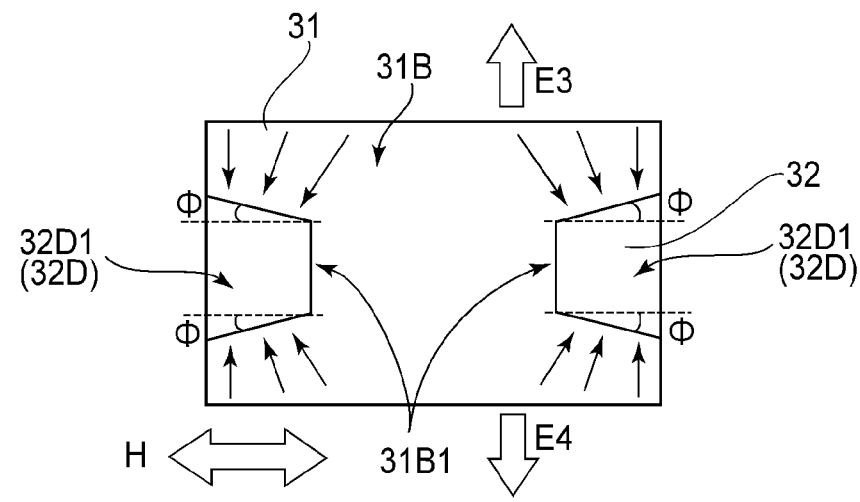
In FIG. 15, (a) to (c) are enlarged views each showing a part of the bearing in Embodiment 2.
Figure 15:
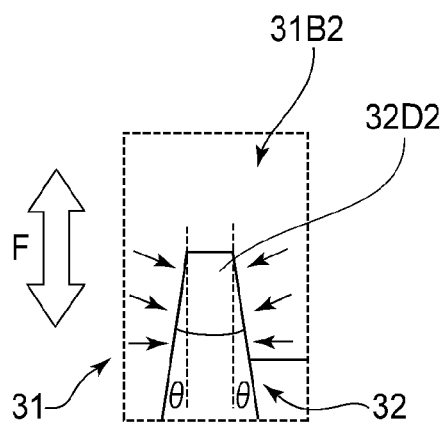
Figure 15:
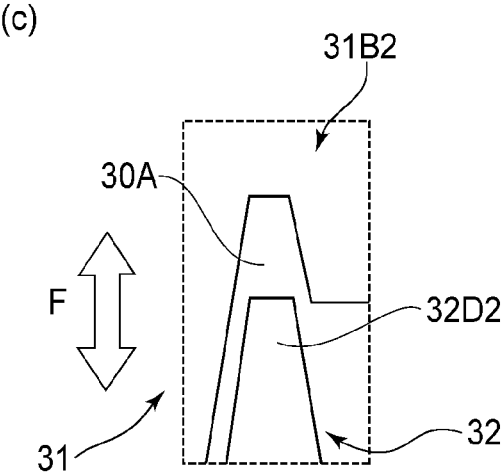

Next, an influence of heat contraction during formation of the bearing 30 will be described with reference to FIG. 15. In FIG. 15, (a) to (c) are sectional views of the neighborhood of the engaging portion 31B and the portion-to-be-engaged 32D of the bearing 30 shown in (b) of FIG. 14. In FIG. 15, (a) is the sectional view of C-C cross section of (a) of FIG. 14, (b) is the sectional view of D-D cross section of (a) of FIG. 14, and (c) is an illustration showing a state in which the movable member 31 is moved from a position of (b) of FIG. 15 in the arrow F direction.

A dimensional relationship, by heat contraction, between the portion-to-be-engaged 32D of the supporting member 32 and the engaging portion 31B of the movable member 31 is as follows. The portion-to-be-engaged 32D of the supporting member 32 is molded early with the first resin material, and then the first resin material is cooled and solidified by a cooling step in the member. Then, after the portion-to-be-engaged 32D is molded, the electroconductive resin material which is the second resin material is injected into a space formed between the supporting member 32 including the portion-to-be-engaged 32D and the molds 29A and 29B. This electroconductive resin material is cooled and solidified from a state immediately after the molding as shown in (a) and (b) of FIG. 15 by a cooling step in the mold via the portion-to-be-engaged 32D and the like, so that the engaging portion 31B is molded.

At this time, the engaging portion 31B contracts by being cooled, so that a force is applied in a direction in which the portion-to-be-engaged 32D is compressed. As a result, a frictional force becomes large at the interface between the portion-to-be-engaged 32D and the engaging portion 31B, so that smooth sliding of the movable member 31 with the supporting member 32 is prevented. Therefore, as shown in (a) of FIG. 15, with respect to a direction in which the portion-to-be-engaged 32D is sandwiched by the engaging portion 31B, compared with one end side of the arrow F direction in which the movable member 31 slides, a thickness of the movable member 31 in the other end side is made thin.

Specifically, the limiting portion 32D1 sandwiched by the supporting portion 31B1 is formed so that surfaces which incline in the arrow E3 direction and the arrow E4 direction, respectively, with respect to the arrow H direction which crosses the arrow F direction and in which the supporting portion 31B1 sandwiches the limiting portion 32D1 oppose each other. Each of the surfaces, of the portion-to-be-engaged 32D, each inclining with respect to the arrow H direction may preferably have an inclination angle φ of 5° or more with respect to the arrow H direction. As a result, irrespective of the influence of the contraction by heat, the movable member 31 can be made smoothly slidable with the supporting member 32. On the other hand, as shown in FIG. 14, the movable member 31 is formed so as to be sandwiched by the base portion 32A with respect to the arrow H direction and has such a shape that the width of the movable member 31 with respect to the arrow H direction increases from one end side toward the other end side with respect to the arrow F direction. As a result, when the movable member 31 moves from one end side toward the other end side, with respect to the arrow H direction, a gap (spacing) 30A is formed between the base portion 32A and the movable member 31 including between the preventing portion 32D2 and the retaining portion 31B2.

Similarly, as shown in (b) of FIG. 15, the preventing portion 32D2 sandwiched by the retaining portion 31B is formed so that surfaces which incline in the arrow E3 direction and the arrow E4 direction, respectively, with respect to the arrow F direction oppose each other. Each of the surfaces inclining with respect to the arrow F direction may preferably have an inclination angle θ of 5° or more with respect to the arrow F direction. As a result, when the movable member 31 is moved from one end side to the other end side, as shown in (c) of FIG. 15, the gap 30A is formed between the preventing portion 32D2 and the retaining portion 31B2. As a result of these, irrespective of the influence of the contraction by heat, the movable member 31 can be made smoothly slidable with the supporting member 32.

In this way, the engaging portion 31B is constituted so that a bottom thereof opposing the opening has a cross section having a recessed shape narrower than the opening, so that the portion-to-be-engaged 32D is prevented from engaging with the engaging portion 31B, thus being prevented from becoming immovable. Further, one or both of the opposing surfaces in the recessed shape are constituted so as to be in parallel to the arrow F direction which is the movement direction, so that the movable member 31 is moved thereby to form the gap 30A between the base portion 32A and the movable member 31, and thus it is possible to smoothly slide the movable member 31.

(Effect of this Embodiment)

As described above, similarly as in Embodiment 1, by employing the constitution according to the present invention, it becomes possible to not only simplify the manufacturing step and the assembling step of the parts but also dispose the movable member and the assembled connection part with high reliability, so that an assembling property of the cartridge can be improved.

Specifically, by using the movable member 31 formed by the injection molding so as to be movable relative to the base portion 32A, it is possible to form the bearing 30 without providing the larger gap than is necessary between the supporting member 32 and the movable member 31. Further, by providing the positioning portion, it is possible to dispose the second frame 18 of the toner accommodating container 26 with high accuracy. By these constitutions, it is possible to realize a constitution in which the movable member 31 contacts the electrical contact portion 24A which is the contact portion with high reliability.

In addition, in this embodiment, in order to use the movable member 31 as the electrode, the electroconductive resin material was used. The electroconductive resin material used for the electrode portion 31A is prepared by dispersing, in a base material having no electroconductivity, electroconductive particles such as carbon black particles or metal particles or electroconductive fibers such as carbon fibers, and therefore the electroconductive resin material hardens in general, while being liable to fragile. For that reason, there is a liability that folding or the like occurs during the assembling of the electrode portion 31A. Further, in the case where an electroconductive resin sheet is used as the remaining amount detecting member 24, the electrode portion 31A and the remaining amount detecting member 24 are assembled while contacting each other, and therefore there was a liability that abrasion or peeling of the electroconductive resin sheet generated. However, by employing the constitution according to this embodiment, these liabilities can be eliminated.

[Embodiment 3]

In Embodiment 2, as the molded resin product, the bearing including the electrode portion slidable with the supporting member in the predetermined was described. In this embodiment, another constitution in which it is possible to stably ensure electrical conduction between an electrode portion of a bearing and an electrical contact portion will be described.

An outline of a cartridge and an image forming apparatus used in this embodiment is similar to that described in Embodiment 1. Further, a structure of the bearing, a sliding structure of a movable member and a molding method of the bearing are similar to those described in Embodiment 2. In the following, constituent elements similar to those in Embodiments 1 and 2 are represented by the same reference numerals or symbols and will be omitted from description, and a difference will be principally described.

(Structure of Developing Unit)

Figure 16:
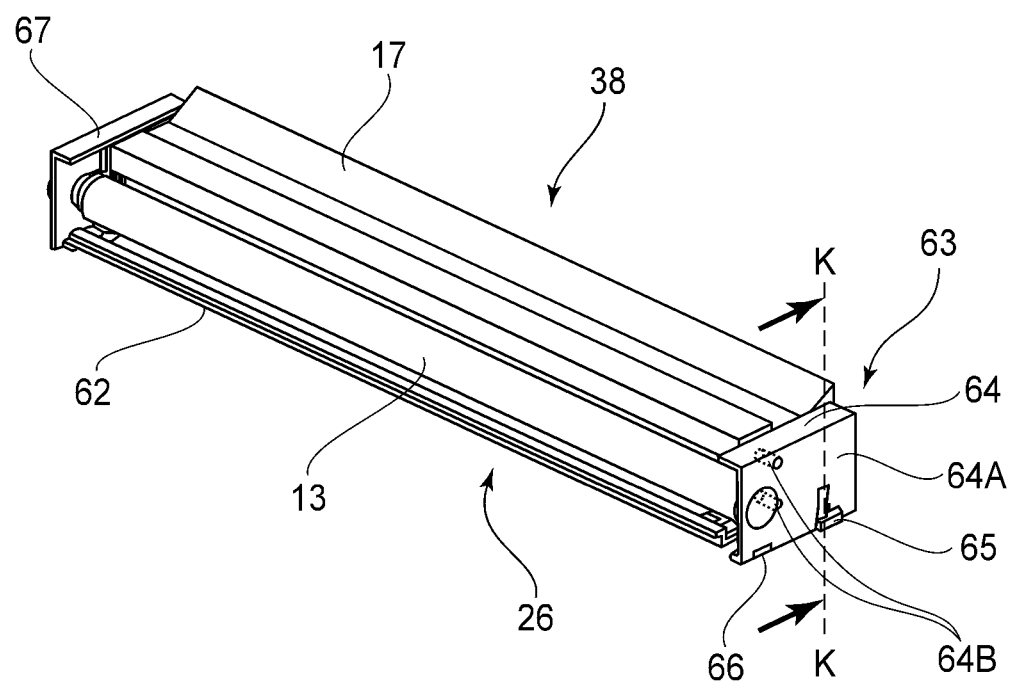
FIG. 16 is a perspective view of a bearing in Embodiment 3.

First, a structure of a developing unit 38 used in this embodiment will be described with reference to FIG. 16. FIG. 16 is a perspective view of the developing unit 38.

Similarly as in Embodiment 1, at longitudinal ends of the toner accommodating container 26, bearings 63 and 67 are provided. The bearing 63 is positioned relative to an unshown positioning portion provided on a second frame 62 by positioning portions 64B provided at two positions on a base portion 64A of a supporting member 64, and is connected to the second frame 62. The bearing 63 includes a movable member 65 and a fixing member 66 which are each formed of an electroconductive resin material. The developing roller 13 is rotatably supported by the bearing 67 in one end side and by the fixing member 66, formed as a part of the bearing 63, in the other end side.

(Structure of Bearing)

Figure 17:
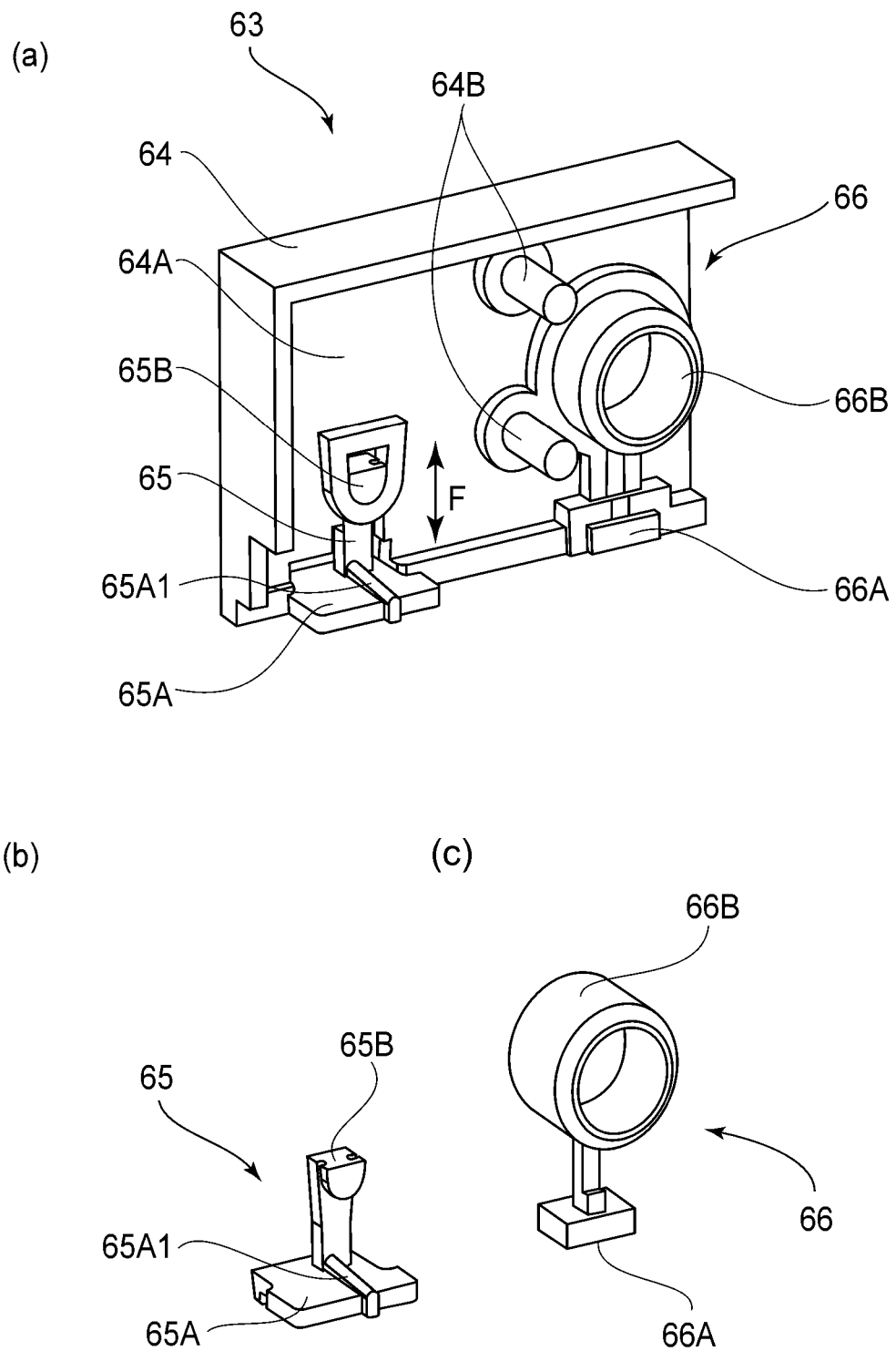
In FIG. 17, (a) to (c) are perspective views each showing a developing unit or parts thereof in Embodiment 3.
Figure 18:
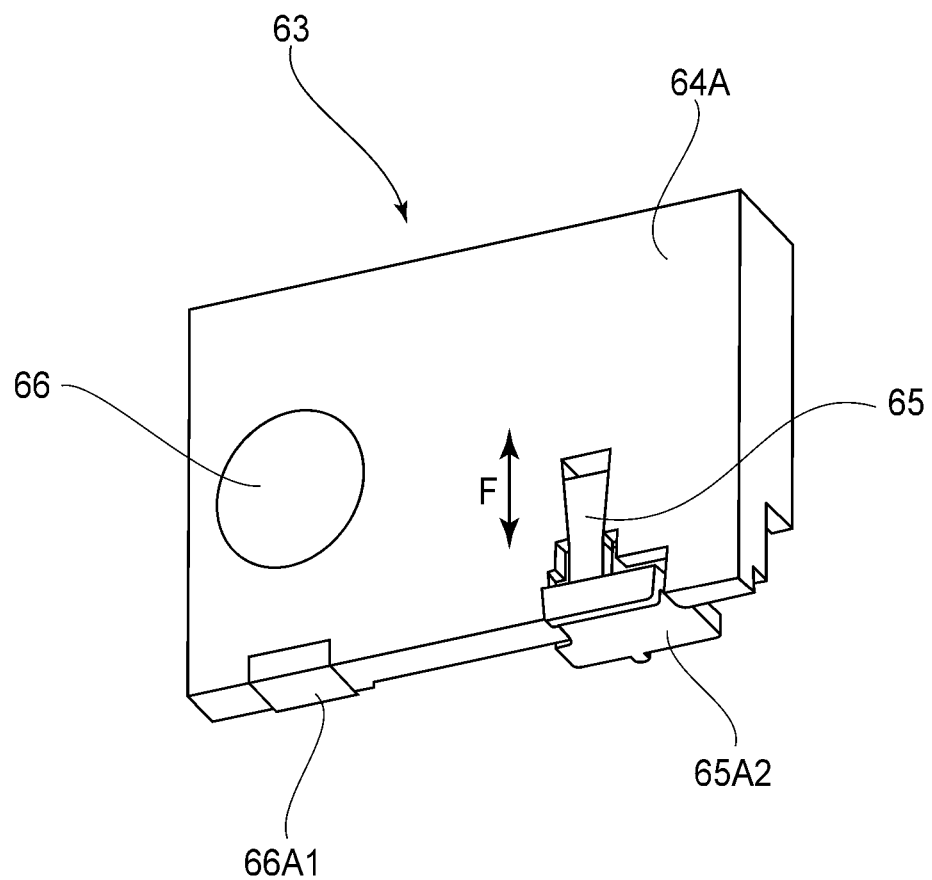
FIG. 18 is a perspective view of the bearing in Embodiment 3.

Next, the bearing used in this embodiment will be described. A structure of the bearing 67 in one end side is similar to that in Embodiment 1. In this embodiment, the bearing 63 in the other end side will be described will be specifically described with reference to FIGS. 17 and 18. In FIG. 17, (a) to (c) are schematic views for illustrating the bearing 63, wherein (a) is a perspective view of an inside of the bearing 63 as seen from obliquely above the bearing 63, and (b) and (c) are perspective views of the movable member 65 and the fixing member 66, respectively. FIG. 8 is a perspective view of an outside of the bearing 63 as seen from obliquely below the bearing 63.

As shown in FIG. 17, the bearing 63 includes the supporting member 64, the movable member 65 and the fixing member 66. The movable member 65 has the slidable constitution in the arrow F direction in the figure similarly as in Embodiment 2, and also the forming method thereof is similar to that in Embodiment 2. An electrode portion 65A of the movable member 65 is provided with a portion-to-be-contacted (electrode contact portion) 65A1 which is an electrical contact portion with a detecting member 70 (FIG. 19) of a second frame 62 described later.

On the other hand, the fixing member 66 is provided with a developing contact portion 66A which is an electrical contact portion for receiving a developing bias supplied from the apparatus main assembly and provided with a bearing portion 66B which is a supporting portion for the developing roller 13. In (b) and (c) of FIG. 17, states of only the movable member 65 and the fixing member 66, respectively, are illustrated, but these two members are formed of the electroconductive resin material and are integrally molded with the supporting member 64. The forming methods of these members are similar to those in Embodiment 2. The developing contact portion 66A and the bearing portion 66B of the fixing member 66 are integrally formed of the electroconductive resin material, and therefore are capable of supplying the developing bias, to the developing roller, supplied from an electrical contact portion surface 66A1 shown in FIG. 18.

(Structure of Contact of Remaining Amount Detecting Portion)

Figure 19:
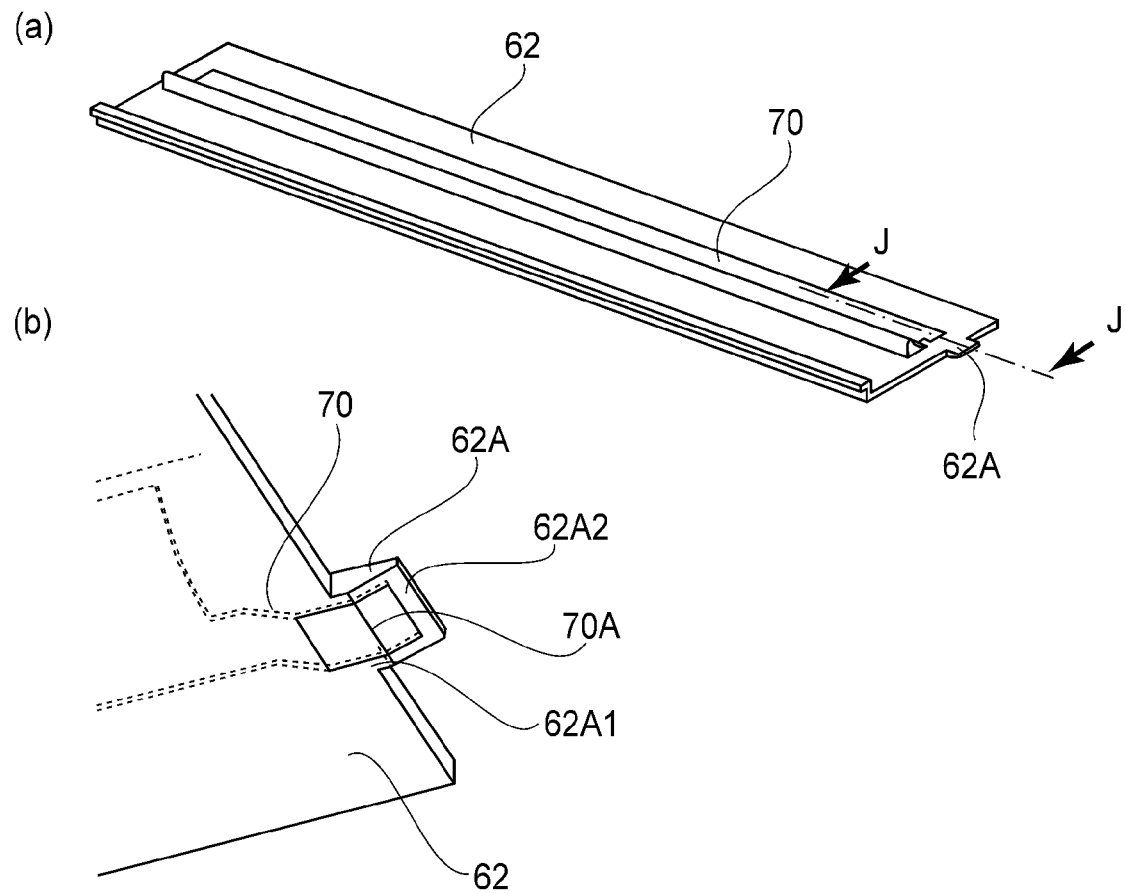
In FIG. 19, (a) and (b) are perspective views each showing a second frame in Embodiment 3.
Figure 20:
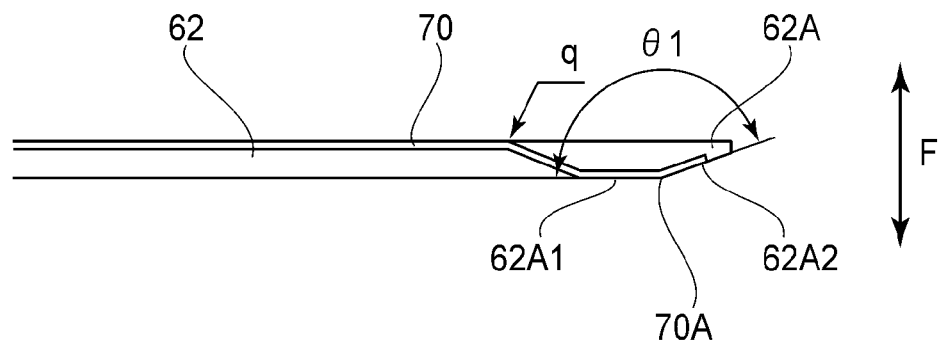
FIG. 20 is a sectional view showing a part of the second frame in Embodiment 3.

A structure of the second frame 62 will be described with reference to FIGS. 19 and 20. In FIG. 19, (a) and (b) show the second frame 18, wherein (a) is a perspective view of the second frame 18 as seen from obliquely above, and (b) is a perspective view of the second frame 18 as seen from obliquely below. FIG. 20 is a sectional view of J-J cross section in (a) of FIG. 19.

As shown in (a) of FIG. 19, similarly as in Embodiment 1, the second frame 62 is provided with a remaining amount detecting member 70 so as to be positioned inside a toner accommodating container 60. The remaining amount detecting member 70 is formed with the electroconductive resin sheet, and in this embodiment, is formed by insert molding, so that the remaining amount detecting member 70 is formed integrally with the second frame 62.

Further, the second frame 62 is provided with an electrical contact portion 62A at a longitudinal end portion in the bearing 67 side which is one end side. As shown in (b) of FIG. 19, at this electrical contact portion 62A, the remaining amount detecting member 70 is formed so as to be positioned on an outer surface of the toner accommodating container 60. That is, as shown in FIG. 20, the remaining amount detecting member 70 is constituted so as to be exposed to the outer surface side via a penetrating portion q penetrating from an inside to the outer surface side of the toner accommodating container 60.

As shown in FIG. 20, the electrical contact portion 62A is constituted by a flat surface portion 62A1 which is a surface perpendicular to a movement direction F of the movable member 65 and an inclined surface 65A2 providing an angle θ1 with respect to the flat surface portion 62A1. The angle θ1 formed between the flat surface portion 62A1 and the inclined surface 62A2 is an obtuse angle, i.e., θ1<180°. The remaining amount detecting member 70 is disposed along a surface cured with respect to a direction crossing the longitudinal direction over a region from the flat surface portion 62A1 to the inclined surface 62A2, and includes an edge line portion 70A. Although specifically described later, this edge line portion 70A is an electrical contact portion with the movable member 65.

Figure 21:
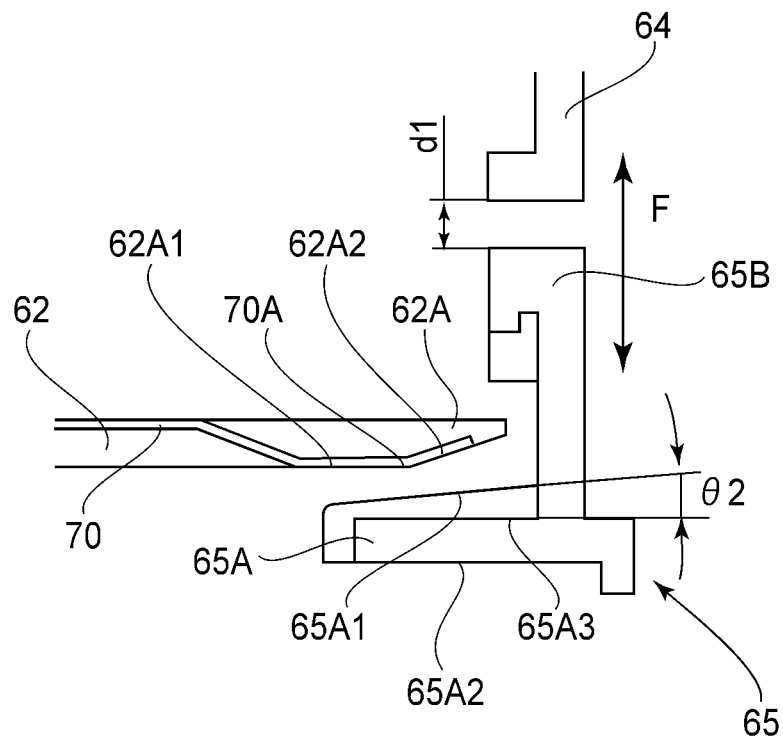
In FIG. 21, (a) and (b) are sectional views each showing a part of the developing unit in Embodiment 3.
Figure 21:
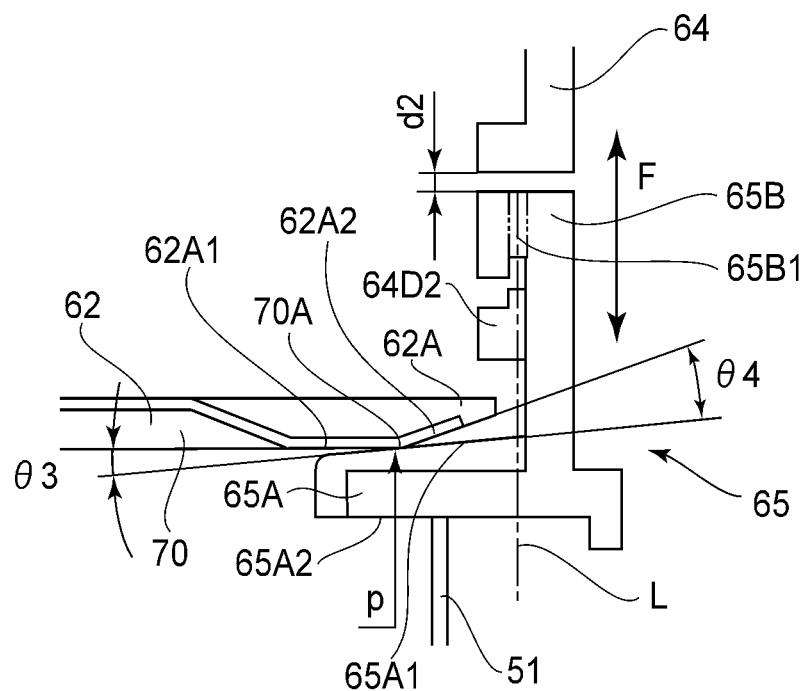
Figure 22:
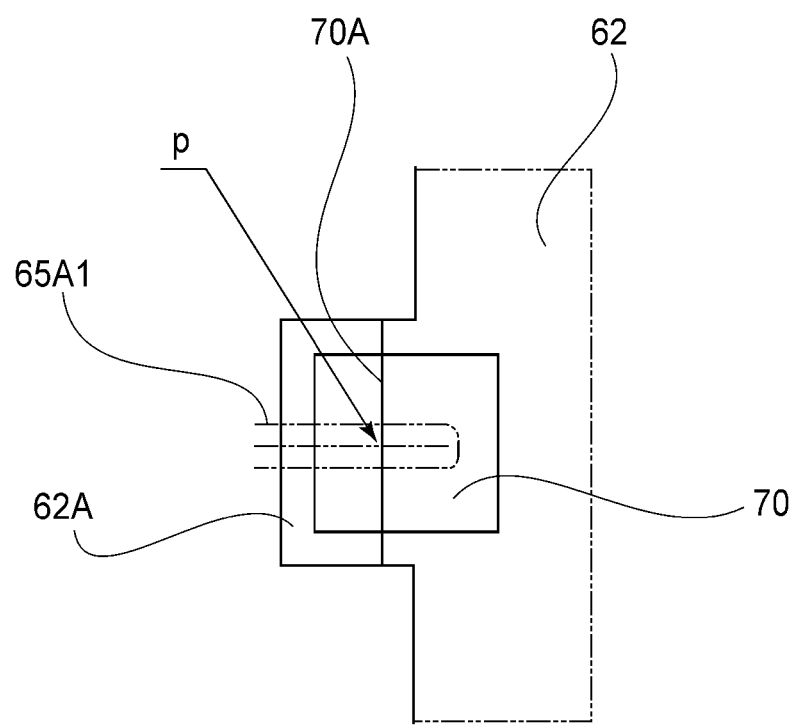
FIG. 22 is an illustration showing the part of the developing unit in Embodiment 3.

Next, a constitution of a state in which the bearing 63 is connected to the toner accommodating container 60 will be described with reference to FIGS. 21 and 22. In FIG. 21, (a) and (b) are sectional views of K-K cross section in FIG. 16, wherein (a) shows a state in which the movable member 65 is spaced from the electrical contact portion 62A of the second frame 62, and (b) shows a state in which the movable member 65 is contacted to the electrical contact portion 62A of the second frame 62. FIG. 22 is an illustration of the electrical contact portion 62A of the second frame 62 as seen from a movable member side.

Similarly as in Embodiment 2, as shown in (b) of FIG. 21, a limiting portion of the supporting member 64 and a groove-shaped supporting portion 65B1 of the movable member 65 engage with each other, so that the movable member 65 is slidable along a line L parallel to the movement direction F. As shown in (a) of FIG. 21, the movable member 65 has a constitution for permitting movement thereof by a distance d1 of a gap provided between itself and the supporting member 64. Further, when the cartridge A is mounted in the apparatus main assembly B, as shown in (b) of FIG. 21, the electrical contact portion 65A2 is pressed by the inputting portion 51 which is a main assembly-side electrical contact member, s that the movable member 65 is moved upward in the arrow F direction in the figure. As a result, the surface curved with respect to the direction crossing the longitudinal direction and the movable member 65, specifically the edge line portion 70A of the remaining amount detecting member 70 and the movable member 65 contact each other.

As shown in FIG. 17, the electrode contact portion 65A1 of the movable member 65 has a cross section, perpendicular to the longitudinal direction, constituting a linear projected portion having an arcuate shape. Further, as shown in (a) of FIG. 21, the electrode contact portion 65A1 is constituted so that a projection amount from a surface 65A3 of the electrode portion 65A perpendicular to the movement direction F of the movable member 65 increases toward a longitudinal end portion and so that the electrode contact portion 65A1 inclines with respect to the longitudinal direction with an angle θ2.

Further, the remaining amount detecting member 70 and the movable member 65 are disposed so that in a contact state ((b) of FIG. 21), the electrode 65A1 and the flat surface portion 62A1 provide a certain angle θ3 and the electrode contact portion 65A1 and the inclined surface 62A2 provide a certain angle θ4. In this embodiment, both the flat surface portion 62A1 of the second frame 62 and the surface 65A3 of the electrode portion 65A of the movable member 65 are surfaces (planes) extending in the longitudinal direction, and therefore are constituted so that the angle θ2 and the angle θ3 are the same angle.

Further, as shown in FIG. 22, the electrode contact portion 65A1 extends in a direction substantially perpendicular to the edge line portion 70A provided at the electrical contact portion 62A of the second frame 62. By employing the above-described constitution, the movable member 65 and the remaining amount detecting member 70 contacts only at a pint p. In this embodiment, the electrode contact portion 65A1 and the edge line portion 70A provided at the electrical contact portion 62A of the second frame 62 are substantially perpendicular to each other, but are contactable to each other only at the point p if these portions cross each other.

In this embodiment, the portion of contact between the movable member 65 and the remaining amount detecting member 70 was constituted as a rectilinear portion, so that a point contact was realized. As a result, an urging force from the inputting portion 51 is concentrated, so that a contact pressure per unit area can be further increased, and therefore electrical conduction between the remaining amount detecting member 70 of the electrical contact portion 62A and the electrode portion 65A of the movable member 65 which are constituted by the electroconductive resin materials can be stably ensured.

Further, the movable member 65 has a distance d2 (<d1) in a gap with the supporting member 64 in a contact state ((b) of FIG. 21). As a result, a constitution in which a portion, of the movable member 65, other than the electrical contact portion is prevented from contacting the supporting member 64 with respect to a movable direction (arrow F direction in the figure) and the contact pressure between the movable member 65 and the remaining amount detecting member 70 can be further enhanced using the urging force from the inputting portion 51 is employed.

Figure 23:
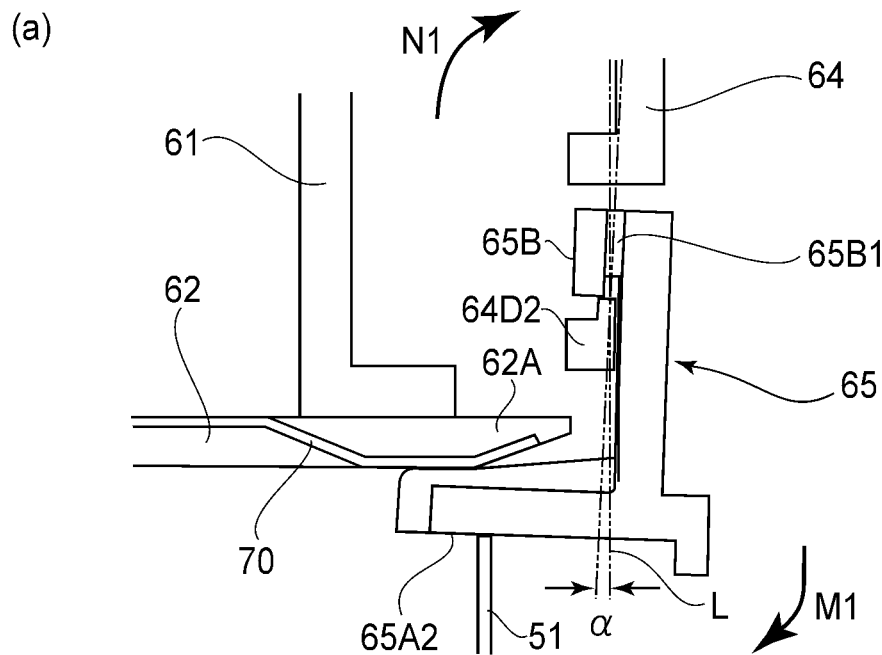
In FIG. 23, (a) and (b) are sectional views each showing the part of the developing unit in Embodiment 3.
Figure 23:
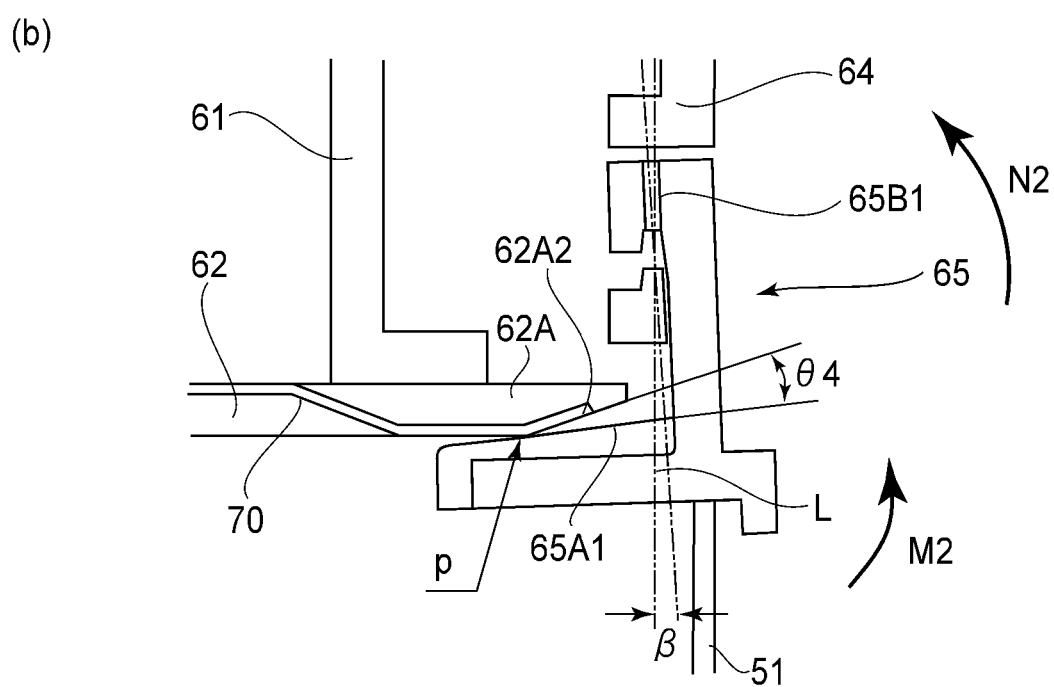

As shown in (a) of FIG. 23, the inputting portion 51 which is an urging member is disposed inside a portion of contact (rectilinear line L in (a) of FIG. 23) between the movable member 65 and the limiting portion and the preventing portion 64D2 of the supporting member 64 with respect to the longitudinal direction. For this reason, moment M1 shown in (a) of FIG. 23 acts on the movable member 65. As a result, the movable member 65 is contacted to the remaining amount detecting member 70 by the moment M1 while inclining in an arrow N1 direction (clockwise) in a range of a gap (spacing) 30A. Specifically, as described in Embodiment 2, the movable member 65 forms the gap 30A or the like ((c) of FIG. 15) when moved in the movable direction (arrow F direction in the figure). For this reason, a constitution in which an angle α formed between the line L parallel to the movement direction F and an extension direction of the groove-shaped supporting portion 65B1 of the movable member 65 in the range of the gap 30A does not become zero, and thus the movable member 65 can be slightly inclined is employed. Therefore, in this embodiment, α<θ3 is satisfied, so that the movable member 65 and the electrical contact portion 62A are constituted so that the contact therebetween is maintained at only the point p.

Further, due to deformation or the like of the inputting portion 51, as shown in (b) of FIG. 23, in the case where the inputting portion 51 which is an urging member is disposed outside a portion of contact between the movable member 65 and the limiting portion and the preventing portion 64D2 of the supporting member 64 with respect to the longitudinal direction, moment M2 shown in (b) of FIG. 23 acts on the movable member 65. As a result, the movable member 65 is inclined in an arrow N2 direction (counterclockwise) by the moment M2. Specifically, an angle β formed between the line L parallel to the movement direction F and an extension direction of the groove-shaped supporting portion 65B1 of the movable member 65 in the range of the gap 30A does not become zero, and thus the movable member 65 can be slightly inclined. Therefore, in this embodiment, β<θ4 is satisfied, so that the movable member 65 and the electrical contact portion 62A are constituted so that the contact therebetween is maintained at only the point p.

Figure 24:
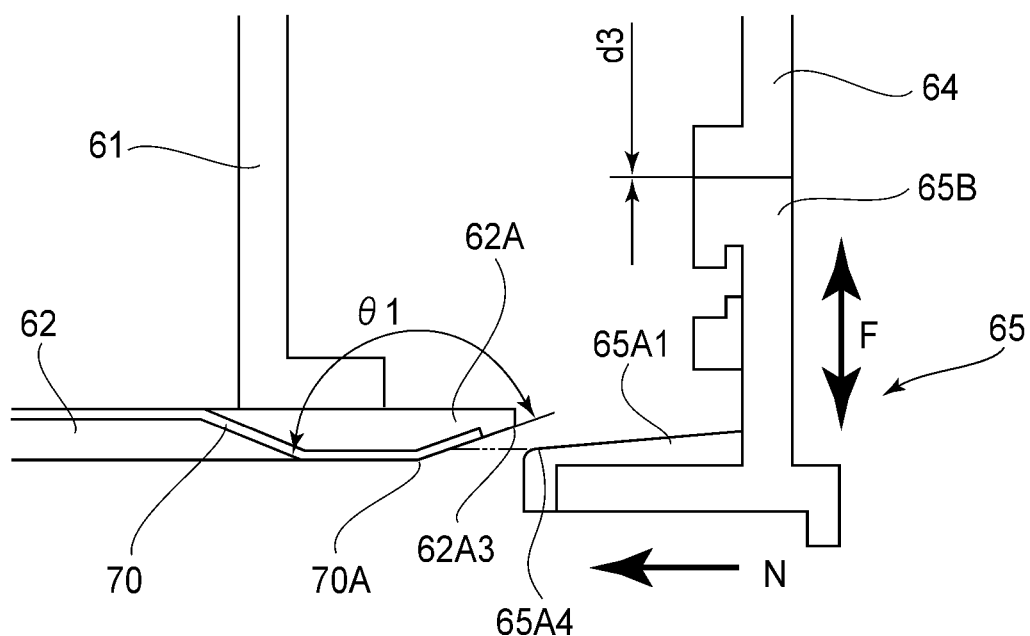
FIG. 24 is an illustration of an assembling structure of the developing unit in Embodiment 3.

Next, with reference to FIG. 24, a constitution of assembling of the bearing 63 with the toner accommodating container 60 will be described. FIG. 24 shows a state before the bearing 63 is mounted on the toner accommodating container 60 and is a sectional view of K-K cross section in FIG. 16. Similarly as in Embodiment 2, the bearing 63 is assembled in a state in which a positioning portion 64B (FIG. 17) is positioned to a portion-to-be-positioned of the toner accommodating container 60. That is, as shown in FIG. 24, the bearing 63 is assembled with respect to the arrow N direction in the figure in a state in which the bearing 63 is positioned relative to the toner accommodating container 60 with respect to a short direction (perpendicular to the longitudinal direction). During this assembling, the movable member 65 is constituted so that an end portion 65A4 thereof and a free end 62A3 of the electrical contact portion 62A do not run against each other even in a state in which the movable member 65 abuts against the supporting member 64 at an upper side of the movable direction (arrow F direction), i.e., even in a state in which a gap d3 is zero. That is, with respect to an assembling direction (longitudinal direction of the developing unit) of the bearing 63, the outside end portion 65A4 of the electrode contact portion 65A1 is formed so as to be positioned below a central end portion 62A3 of the electrical contact portion 62A provided as a part of the second frame 62. In this way, during the assembling, in the movable range of the movable member 65, a constitution in which the end portion 65A4 of the movable member 65 and the free end 62A3 of the electrical contact portion 62A do not run against each other is employed, so that breakage or the like is prevented.

Effect in this Embodiment

As described above, in this embodiment, the electrode contact portion 65A1 increased in projection amount toward the longitudinal end portion was provided as a part of the movable member, and the electrical contact portion 62A of the remaining amount detecting member 70 was formed at the surface curved with respect to the direction crossing the longitudinal direction. Further, the electrode contact portion 65A1 and the electrical contact portion 62A formed at the surface curved with respect to the direction crossing the longitudinal direction are contacted to each other, so that the contact pressure per unit area can be enhanced and thus the electrical conduction between the electrode portion of the bearing and the electrical contact portion can be stably ensured. This constitution is particularly effective in the case where the electrode portion of the bearing and the electrical contact portion are formed of the electroconductive resin material. Further, the electrode contact portion 65A1 was formed as the linear projected portion, of the movable member 65, where the projection amount increased toward the longitudinal end portion. As a result, in the case where the movable member 65 is prepared as a part of the bearing 63 by injection molding, by using a drawing slope used for parting the mold, a shape of the movable member 65 can be easily formed.

Further, in this embodiment, in consideration of a slope of the movable member 65 by the longitudinal position of the inputting portion 51, the angle θ3 (angle formed between the electrode contact portion 65A1 and the flat surface portion 62A1) and the angle θ4 (angle formed between the electrode contact portion 65A1 and the inclined surface 62A2) were set. As a result, the electrical conduction can be stably ensured even in the case where the contact position of the inputting portion 51 with the movable member 65 fluctuates due to deformation or the like of the inputting portion 51, e.g., during transportation in the case where the cartridge A is mounted and packed in the apparatus main assembly B.

Further, in this embodiment, the positioning is made by the positioning portion 64B and the portion-to-be-positioned of the toner accommodating container 60, so that the bearing 63 and the second frame 62 are integrated with each other. At this time, a constitution in which even in the state the movable member 65 runs against the supporting member 64, the end portion 65A4 of the movable member 65 and the free end 62A3 of the electrical contact portion 62A are prevented from running against each other is employed. As a result, a constitution in which the end portion 65A4 of the movable member 65 and the free end 62A3 of the electrical contact portion 62A are prevented from running against each other in the movable range of the movable member 65 during the assembling is employed, so that breakage or the like can be prevented.

Figure 25:
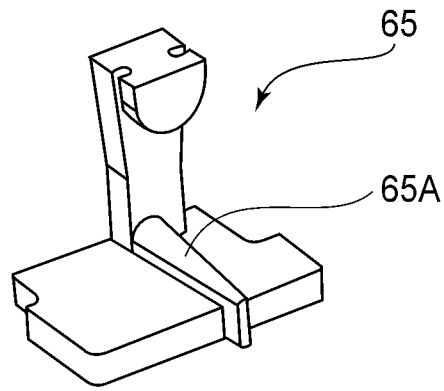
In FIG. 25, (a) to (c) are perspective views each showing another example of a movable member in Embodiment 3.
Figure 25:
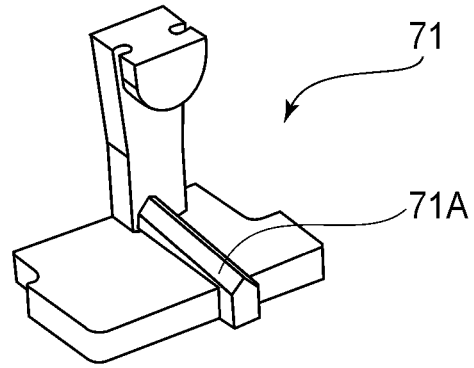
Figure 25:
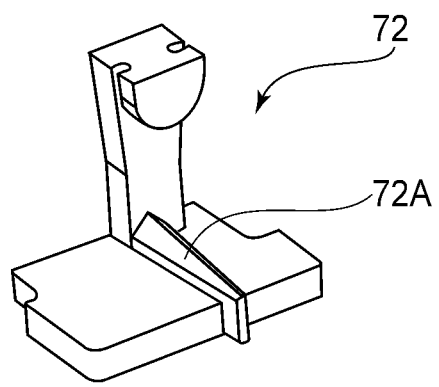

In this embodiment, the electrode contact portion 65A1 of the movable member 65 was formed as the linear projected portion which had an arcuate shape in cross section perpendicular to the longitudinal direction and which was increased in projection amount toward the longitudinal end portion as shown in (a) of FIG. 25. However, as a modified embodiment, a constitution in which a simple projected portion is provided or a constitution in which as in a movable member 71 shown in (b) of FIG. 25, an electrode contact portion 71A consisting of a linear projected portion which has a triangular shape in cross section perpendicular to the longitudinal direction and which has a projection amount unchanged over the longitudinal direction is provided may also be employed. Alternatively, a constitution in which as in a movable member 72 shown in (c) of FIG. 25, an electrode contact portion 72A consisting of a linear projected portion which has a triangular shape in cross section perpendicular to the longitudinal direction and which increases in projection amount toward the longitudinal end portion is provided or the like constitution may also be employed.

(Other Embodiments)

Figure 26:
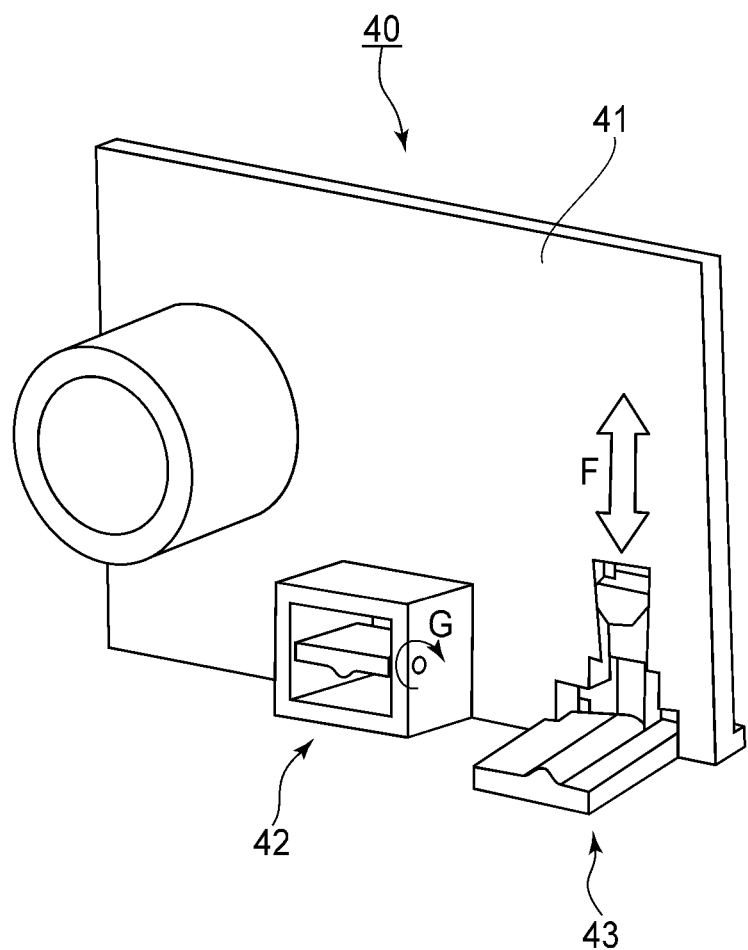
FIG. 26 is a perspective view showing an example of a movable member in another embodiment.

In the above-described embodiments, as the molded resin product, the bearing including the movable member rotatable relative to the supporting member and the bearing including the movable member slidable with the supporting member were described. However, the present invention is not limited, but as shown in FIG. 26, a constitution in which a plurality of movable members 42 and 43 are provided for a supporting member 41 may also be employed. In this case, a relation and a constitution of the supporting member 41 and the movable member 42 are constituted similarly as in Embodiment 1, so that the movable member 42 is rotatable in an arrow G direction. Further, a relation and a constitution of the supporting member 41 and the movable member 43 are constituted similarly as in Embodiment 2, so that the movable member 43 is slidable in an arrow F direction.

In the above-described embodiments, the case where the electroconductive resin material is used for the movable member, but the present invention is not limited thereto, and an insulative resin material may also be used.

While the invention has been described with reference to the structures disclosed herein, it is not confined to the details set forth and this application is intended to cover such modifications or changes as may come within the purpose of the improvements or the scope of the following claims.

This application claims the benefit of Japanese Patent Application Nos. 2014-084038 filed on Apr. 15, 2014 and 2015-021651 filed Feb. 5, 2015, which are hereby incorporated by reference herein in their entirety.

What is claimed is:

1. A molded resin product for use with an image forming apparatus, the molded resin product comprising: a base portion formed of a resin material; and a movable member, wherein the movable member includes an engaging portion, wherein the engaging portion includes a groove having mutually opposing surfaces, with a distance between the mutually opposing surfaces becoming narrower toward a bottom of the groove, and wherein the base portion includes a portion-to-be-engaged protruding into the groove for permitting movement of the movable member relative to the base portion in a movement direction by engaging with the engaging portion to guide the engaging portion.

2. A molded resin product according to claim 1, wherein the movable member is formed on the base portion by injection molding.

3. A molded resin product according to claim 1, wherein at least one of the mutually opposing surfaces is non-parallel to the movement direction of the moveable member.

4. A molded resin product according to claim 1, wherein the base portion is formed of a first resin material having no electroconductivity, and the movable member is formed of a second resin material which has no affinity for the first resin material and which has electroconductivity.

5. A molded resin product according to claim 4, wherein the movable member is an electrode.

6. A molded resin product according to claim 1, wherein the movable member is undetachable from the molded resin product.

7. A cartridge detachably mountable to an image forming apparatus, the cartridge comprising:
   a molded resin product including a base portion formed of a resin material and a movable member,
   wherein the movable member includes an engaging portion,
   wherein the engaging portion includes a groove having mutually opposing surfaces, with a distance between the mutually opposing surfaces becoming narrower toward a bottom of the groove, and
   wherein the base portion includes a portion-to-be-engaged protruding into the groove for permitting movement of the movable member relative to the base portion in a movement direction by engaging with the engaging portion to guide the engaging portion.

8. A cartridge according to claim 7, wherein the movable member is formed on the base portion by injection molding.

9. A cartridge according to claim 7, wherein at least one of the mutually opposing surfaces is non-parallel to the movement direction of the moveable member.

10. A cartridge according to claim 7, further comprising a connection member connectable to the molded resin product,
   wherein the connection member includes an electrical contact portion, and the movable member is an electrode connectable to the electrical contact portion.

11. A cartridge according to claim 10, wherein the base portion is formed of a first resin material having no electroconductivity, and the movable member is formed of a second resin material which has no affinity for the first resin material and which has electroconductivity.

12. A cartridge according to claim 10, further comprising:
   a developing roller;
   a toner accommodating container for accommodating toner; and
   a remaining amount detecting member provided in the toner accommodating container,
   wherein the electrical contact portion is connected to the remaining amount detecting member.

13. A cartridge according to claim 12, further comprising urging means for urging the movable member toward the electrical contact portion when the movable member is mounted in the image forming apparatus.

14. A cartridge according to claim 12, wherein the molded resin product is connected to one of end portions of the connection member with respect to a longitudinal direction of the connection member,
   wherein the connection member has a curved surface curved in a direction crossing the longitudinal direction, and the electrical contact portion is exposed on the curved surface, and
   wherein the movable member is formed of an electroconductive resin material so as to include a projected portion extending in the longitudinal direction, and the electrical contact portion and the projected portion are contacted to each other so as to be electrically connectable with each other.

15. An image forming apparatus comprising:
   a molded resin product according to claim 1.

16. An image forming apparatus comprising:
   a cartridge according to claim 7,
   wherein the cartridge is detachably mountable to the image forming apparatus.

17. A cartridge according to claim 11, wherein the movable member is an electrode.

* * * * *